US008935630B2

(12) United States Patent
Wroblewski

(10) Patent No.: US 8,935,630 B2
(45) Date of Patent: Jan. 13, 2015

(54) METHODS AND SYSTEMS FOR SCROLLING AND POINTING IN USER INTERFACES

(75) Inventor: Frank J. Wroblewski, Gaithersburg, MD (US)

(73) Assignee: Hillcrest Laboratories, Inc., Rockville, MD (US)

(*) Notice: Subject to any disclaimer, the term of this patent is extended or adjusted under 35 U.S.C. 154(b) by 2545 days.

(21) Appl. No.: 11/417,764

(22) Filed: May 4, 2006

(65) Prior Publication Data
US 2006/0250358 A1 Nov. 9, 2006

Related U.S. Application Data

(60) Provisional application No. 60/677,516, filed on May 4, 2005, provisional application No. 60/683,963, filed on May 24, 2005.

(51) Int. Cl.
G06F 3/048 (2013.01)
H04N 5/445 (2011.01)
G06F 3/0346 (2013.01)
G06F 3/0484 (2013.01)
G06F 3/0485 (2013.01)
H04N 5/44 (2011.01)
H04N 5/45 (2011.01)
H04N 7/01 (2006.01)
H04N 21/422 (2011.01)
H04N 21/431 (2011.01)
(Continued)

(52) U.S. Cl.
CPC .......... H04N 5/44582 (2013.01); G06F 3/0346 (2013.01); G06F 3/04847 (2013.01); G06F 3/0485 (2013.01); G08C 2201/32 (2013.01); H04N 5/4403 (2013.01); H04N 5/45 (2013.01); H04N 7/012 (2013.01); H04N 21/42204 (2013.01); H04N 21/4316 (2013.01); H04N 21/47 (2013.01); H04N 21/482 (2013.01); H04N 2005/4419 (2013.01); H04N 2005/4432 (2013.01)
USPC .......................... 715/784; 715/764; 715/786

(58) Field of Classification Search
USPC .......... 345/156, 157, 163, 204; 715/786, 856, 715/764, 780, 784
See application file for complete search history.

(56) References Cited

U.S. PATENT DOCUMENTS 5,680,152 A * 10/1997 Bricklin ........................ 345/684
6,654,002 B1    11/2003 Yamaki
6,690,391 B1 *  2/2004 Proehl et al. .................. 715/720
(Continued)

FOREIGN PATENT DOCUMENTS

JP    2-230294 A    9/1990
JP    3-176721 A    7/1991
(Continued)

OTHER PUBLICATIONS

International Search Report for PCT/US06/16780, mailed Sep. 17, 2007.
(Continued)

Primary Examiner — Ramy M Osman
(74) Attorney, Agent, or Firm — Patent Portfolio Builders PLLC

(57) ABSTRACT

Systems and methods according to the present invention address these needs and others by providing a structure for navigating in a GUI with a handheld device, e.g., a 3D pointing device, which incorporates buttons and a scroll wheel.

9 Claims, 23 Drawing Sheets

(51) Int. Cl.
*H04N 21/47* (2011.01)
*H04N 21/482* (2011.01)

(56) References Cited

U.S. PATENT DOCUMENTS

| | | | |
|---|---|---|---|
| 6,828,958 B2 | 12/2004 | Davenport | |
| 6,857,128 B1 | 2/2005 | Borden, IV et al. | |
| 6,972,776 B2 | 12/2005 | Davis et al. | |
| 7,379,050 B2* | 5/2008 | Chou et al. | 345/163 |
| 7,489,297 B2* | 2/2009 | Hohmann et al. | 345/158 |
| 8,701,037 B2* | 4/2014 | Voros et al. | 715/784 |
| 2002/0109709 A1* | 8/2002 | Sagar | 345/705 |
| 2002/0135602 A1 | 9/2002 | Davis et al. | |
| 2003/0076301 A1 | 4/2003 | Tsuk et al. | |
| 2004/0021694 A1 | 2/2004 | Doar | |
| 2004/0104891 A1* | 6/2004 | Sacca et al. | 345/156 |
| 2004/0145564 A1 | 7/2004 | Duarte et al. | |
| 2004/0268393 A1 | 12/2004 | Hunleth | |
| 2005/0097601 A1* | 5/2005 | Danker et al. | 725/39 |
| 2005/0177305 A1* | 8/2005 | Han | 340/995.14 |
| 2005/0243061 A1 | 11/2005 | Liberty | |
| 2005/0243062 A1 | 11/2005 | Liberty | |
| 2005/0253806 A1 | 11/2005 | Liberty | |
| 2006/0028446 A1 | 2/2006 | Liberty | |
| 2006/0033728 A1* | 2/2006 | Sako | 345/204 |
| 2006/0236263 A1* | 10/2006 | Bathiche et al. | 715/786 |
| 2007/0050087 A1* | 3/2007 | Ishihara et al. | 700/245 |

FOREIGN PATENT DOCUMENTS

| | | |
|---|---|---|
| JP | 8-161098 A | 6/1996 |
| JP | 2000-163216 A | 6/2000 |
| JP | 2006-18965 A | 1/2006 |

OTHER PUBLICATIONS

Written Opinion for PCT/US06/16780, mailed Sep. 17, 2007.
Japanese Office Action in corresponding Japanese Application No. 2012-105986 mailed Aug. 6, 2013.
R.J. Manulik, "Mouse Assisted Scrolling Function for Multimedia Displays", IBM Technical Disclosure Bulletin, Dec. 1994, vol. 37, No. 12, pp. 495-496.
J. Taylor, "Using a Mouse to Scroll Through Documents", IBM Technical Disclosure Bulletin, May 1998, vol. 41, No. 409.
Shumin Zhai et al., "Improving Browsing Performance: A study of four input devices for scrolling and pointing tasks", Proceedings of INTERACT97: The Sixth IFIP Conference on Human-Computer Interaction, Jul. 14-18, 1997, pp. 286-292, Sydney, Australia.
Summons to Attend Oral Proceedings and Summary of Procedure mailed Aug. 21, 2014 in related EP Application No. 06758910.1.

* cited by examiner

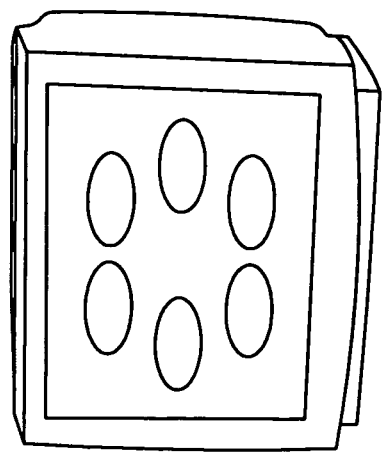
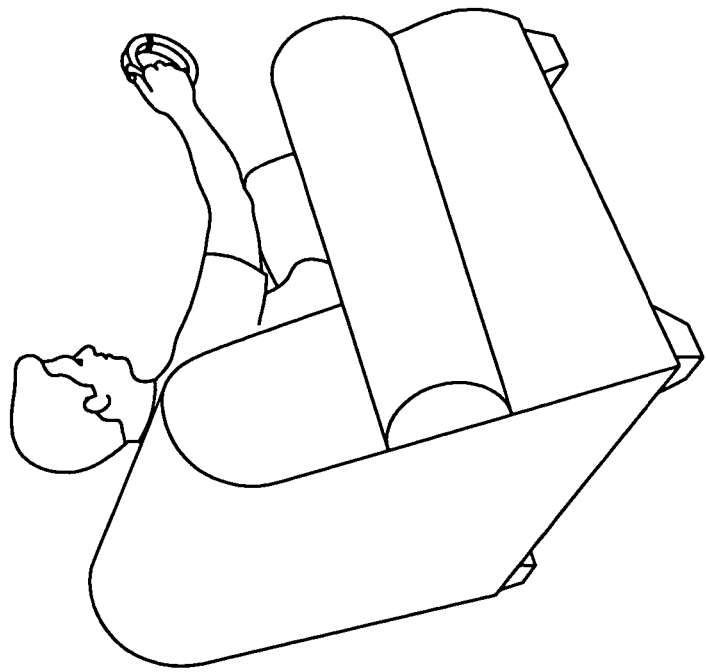
FIG. 3B

FIG. 5A

| 8 | Show 2 | Show 3 | Show 4 | Show 5 |
|---|---|---|---|---|
| 9 | Show 6 | Show 7 | Show 8 | Show 9 |
| 10 | Show 10 | Show 11 | Show 12 | Show 13 |
| 11 | Show 14 | Show 15 | Show 16 | Show 17 |
| 12 | Show 18 | Show 19 | Show 20 | Show 21 |
| 13 | Show 22 | Show 23 | Show 24 | Show 25 |

FIG. 5B

| 8 | Show 2 | Show 3 | Show 4 | Show 5 |
|---|---|---|---|---|
| 9 | Show 6 | Show 7 | Show 8 | Show 9 |
| 10 | Show 10 | Show 11 | Show 12 | Show 13 |
| 11 | Show 14 | Show 15 | Show 16 | Show 17 |
| 12 | Show 18 | Show 19 | Show 20 | Show 21 |
| 13 | Show 22 | Show 23 | Show 24 | Show 25 |

| 8 | Show 2 | Show 3 | Show 4 | Show 5 |
|---|---|---|---|---|
| 9 | Show 6 | Show 7 | Show 8 | Show 9 |
| 10 | Show 10 | Show 11 | Show 12 | Show 13 |
| 11 | Show 14 | Show 15 | Show 16 | Show 17 |
| 12 | Show 18 | Show 19 | Show 20 | Show 21 |
| 13 | Show 22 | Show 23 | Show 24 | Show 25 |

| 2 | Show 2 | Show 3 | Show 4 | Show 5 |
|---|---|---|---|---|
| 3 | Show 6 | Show 7 | Show 8 | Show 9 |
| 4 | Show 10 | Show 11 | Show 12 | Show 13 |
| 5 | Show 14 | Show 15 | Show 16 | Show 17 |
| 6 | Show 18 | Show 19 | Show 20 | Show 21 |
| 7 | Show 22 | Show 23 | Show 24 | Show 25 |

| 2 | Show 2 | Show 3 | Show 4 | Show 5 |
|---|---|---|---|---|
| 3 | Show 6 | Show 7 | Show 8 | Show 9 |
| 4 | Show 10 | Show 11 | Show 12 | Show 13 |
| 5 | Show 14 | Show 15 | Show 16 | Show 17 |
| 6 | Show 18 | Show 19 | Show 20 | Show 21 |
| 7 | Show 22 | Show 23 | Show 24 | Show 25 |

FIG. 16

War | Westerns | New Releases | Recomended | All Movies

The Bourne Supremacy

[Go] Matt Damon
[Go] Julia Stiles
[Go] Joan Allen 108 min. R  Avail. Until: 1/28/05  $3.99

(2004) They should have left him alone. Academy Award winner [Go] Matt Damon is back as expert assassin Jason Bourne in the Stunning non-stop action hit. Fueled by awesome fight scenes and Some of the most breathtaking chase sequences ever filmed, it's a State-of-the-art espionage thriller that explodes into action.

Buy Now
Preview
Special Offer — 1306

Related Titles

Bourne Identity | Good Will Hunting | Ocean's Eleven | Talented Mr. Ripley 1302
1304

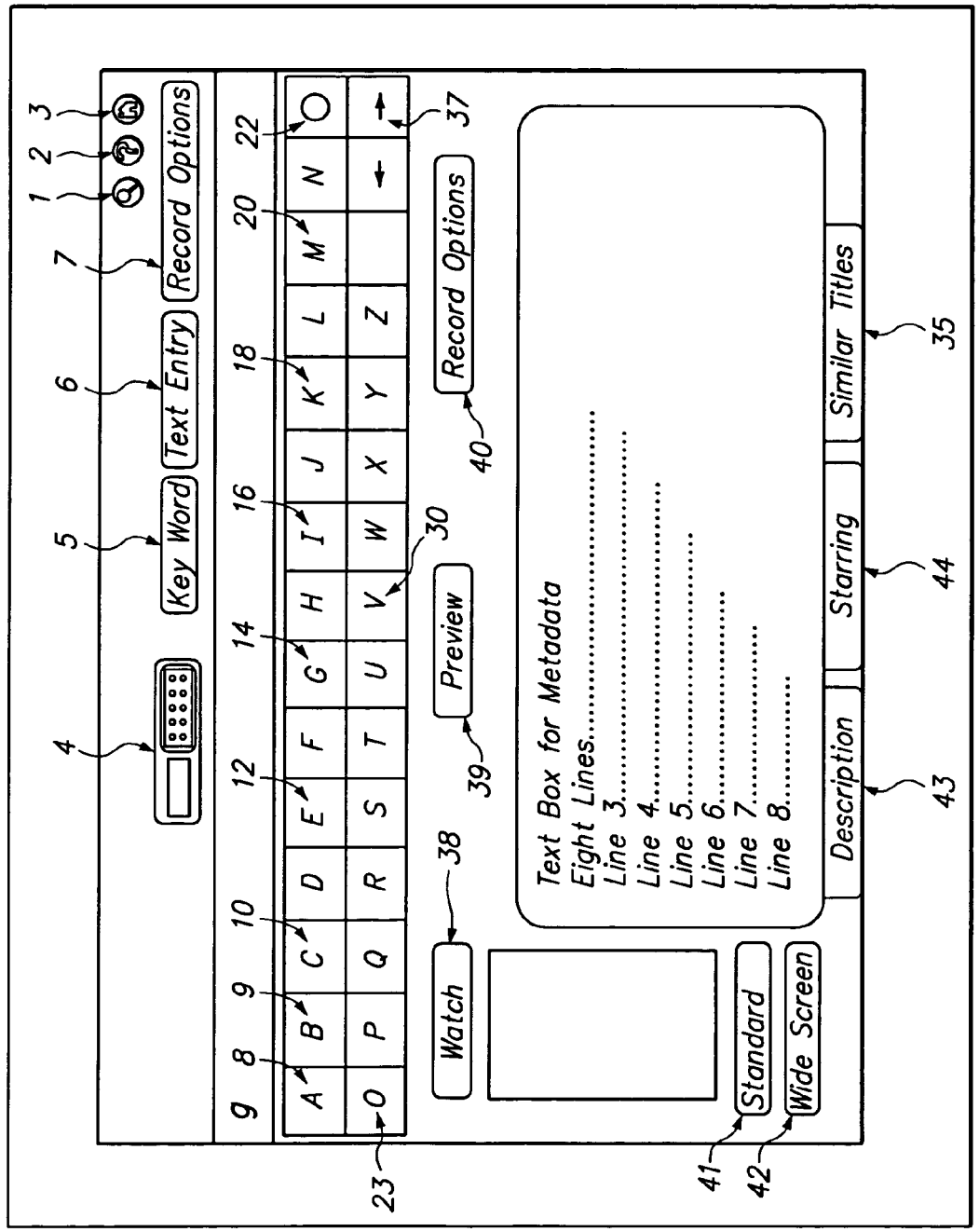

METHODS AND SYSTEMS FOR SCROLLING AND POINTING IN USER INTERFACES

RELATED APPLICATIONS

This application is related to, and claims priority from, U.S. Provisional Patent Application Ser. No. 60/677,516 filed on May 4, 2005, entitled "Scroll-Wheel Interaction Design" and U.S. Provisional Patent Application Ser. No. 60/683,963 filed on May 24, 2005, entitled "Scroll-Wheel Interaction Design", the disclosures of which are incorporated here by reference.

BACKGROUND

This application describes, among other things, scroll-wheel interactions combined with pointing techniques, systems and devices.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface, control device options and frameworks for televisions has not changed much over the last 30 years. Printed guides are still the most prevalent mechanism for conveying programming information. The multiple button remote control with up and down arrows is still the most prevalent channel/content selection mechanism. The reaction of those who design and implement the TV user interface to the increase in available media content has been a straightforward extension of the existing selection procedures and interface objects. Thus, the number of rows in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of segregable components. An example of this trend is the combination television/VCR/DVD in which three previously independent components are frequently sold today as an integrated unit. This trend is likely to continue, potentially with an end result that most if not all of the communication devices currently found in the household will be packaged together as an integrated unit, e.g., a television/VCR/DVD/internet access/radio/stereo unit. Even those who continue to buy separate components will likely desire seamless control of, and interworking between, the separate components. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation. Some remote units have addressed this problem by adding "soft" buttons that can be programmed with the expert commands. These soft buttons sometimes have accompanying LCD displays to indicate their action. These too have the flaw that they are difficult to use without looking away from the TV to the remote control. Yet another flaw in these remote units is the use of modes in an attempt to reduce the number of buttons. In these "moded" universal remote units, a special button exists to select whether the remote should communicate with the TV, DVD player, cable set-top box, VCR, etc. This causes many usability issues including sending commands to the wrong device, forcing the user to look at the remote to make sure that it is in the right mode, and it does not provide any simplification to the integration of multiple devices. The most advanced of these universal remote units provide some integration by allowing the user to program sequences of commands to multiple devices into the remote. This is such a difficult task that many users hire professional installers to program their universal remote units.

Some attempts have also been made to modernize the screen interface between end users and media systems. However, these attempts typically suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be speedier to traverse than list interfaces for large collections of media items, but are not readily adaptable to small collections of media items. Additionally, users tend to lose interest in selection processes wherein the user has to move through three or more layers in a tree structure. For all of these cases, current remote units make this selection process even more tedious by forcing the user to repeatedly depress the up and down buttons to navigate the list or hierarchies. When selection skipping controls are available such as page up and page down, the user usually has to look at the remote to find these special buttons or be trained to know that they even exist. Accordingly, organizing frameworks, techniques and systems which simplify the control and screen interface between users and media systems as well as accelerate the selection process, while at the same time permitting service providers to take advantage of the increases in available bandwidth to end user equipment by facilitating the supply of a large number of media items and new services to the user have been proposed in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference.

Of particular interest for this specification are the remote devices usable to interact with such frameworks, as well as other applications, systems and methods for these remote devices for interacting with such frameworks. As mentioned in the above-incorporated application, various different types of remote devices can be used with such frameworks including, for example, trackballs, "mouse"-type pointing devices, light pens, etc. However, another category of remote devices which can be used with such frameworks (and other applications) is 3D pointing devices with scroll wheels. The phrase "3D pointing" is used in this specification to refer to the ability of an input device to move in three (or more) dimensions in the air in front of, e.g., a display screen, and the corresponding ability of the user interface to translate those motions directly into user interface commands, e.g., movement of a cursor on the display screen. The transfer of data between the 3D pointing device may be performed wirelessly or via a wire connecting the 3D pointing device to another device. Thus "3D pointing" differs from, e.g., conventional computer mouse pointing techniques which use a surface, e.g., a desk surface or mousepad, as a proxy surface from which relative movement of the mouse is translated into cursor movement on the computer display screen. An example of a 3D pointing device can be found in U.S. patent application Ser. No. 11/119,663, the disclosure of which is incorporated here by reference.

However, there is significant room for improvement in the area of handheld device interactions with user interfaces, generally, and interactions between 3D pointers having scroll-wheels and their associated user interfaces, more specifically.

SUMMARY

Systems and methods according to the present invention address these needs and others by providing a handheld device, e.g., a 3D pointing device, which incorporates buttons and a scroll wheel.

According to one exemplary embodiment of the invention, a method for switching between a scrolling mode and a pointing mode in a user interface includes the steps of: moving a remote control device to generate a corresponding movement in a cursor while in the pointing mode, rotating a scroll wheel to enter the scrolling mode and move the cursor, and disabling the pointing mode in response to the rotating step.

According to another exemplary embodiment, a method for switching between a scrolling mode and a pointing mode in a user interface includes the steps of: rotating a scroll wheel to enter the scrolling mode and move a cursor, moving at least one of a cursor and a highlighting of an object in response to the rotation of the scroll wheel, and disabling the pointing mode for a first predetermined time period after the rotation of the scroll wheel.

According to yet another exemplary embodiment, a method for scrolling through objects includes the steps of rotating a scroll wheel at a first rotation rate, selecting sequential objects in response to the first rotating step, rotating the scroll wheel at second rotation rate, and selecting non-sequential objects in response to the second rotating step.

According to yet another exemplary embodiment, a method for scrolling though objects includes the steps of: rotating a scroll wheel on a remote control device, and skipping object selection based on a speed of rotation of the scroll wheel.

According to yet another exemplary embodiment, a method for jump scrolling through objects includes the steps of: detecting a jump scroll gesture, and skipping a group of objects which are positioned next in a scrolling sequence relative to a current cursor position to select another object in response to the jump scroll gesture.

According to still another exemplary embodiment of the present invention, an electronic program guide includes a grid having a first group of channel number objects displayed as rectangular boxes in the grid and a second group of show name objects, also displayed as rectangular boxes in the grid, wherein a scroll order, associated with an order in which objects displayed on the electronic program guide are selected via scrolling, provides for the second group of show name objects to follow the first group of channel number objects.

BRIEF DESCRIPTION OF THE DRAWINGS

The accompanying drawings illustrate exemplary embodiments of the present invention, wherein:

FIG. 3(b) illustrates a user employing a 3D pointing device to provide input to a user interface on a television according to an exemplary embodiment of the present invention;

FIGS. 5(a) and 5(b) depict a method of jump scrolling according to an exemplary embodiment of the present invention;

FIG. 16 illustrates the scrollable order of a detail view with scrollable categories according to an exemplary embodiment of the present invention;

FIG. 17 shows the combination of text entry search integrated with a detail view according to an exemplary embodiment of the present invention;

DETAILED DESCRIPTION

Figure 1:
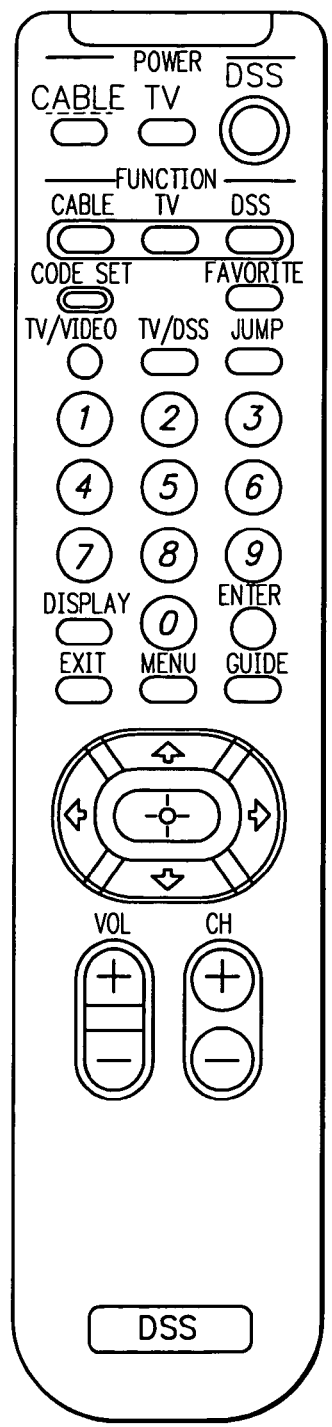
FIG. 1 depicts a conventional remote control unit for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 in which the present invention can be implemented will first be described with respect to FIG. 2. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a 3D pointing device. The wireless I/O control device 226 can communicate with the entertainment system 200 using, e.g., an IR or RF transmitter or transceiver. Alternatively, the I/O control device can be connected to the entertainment system 200 via a wire.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 2:
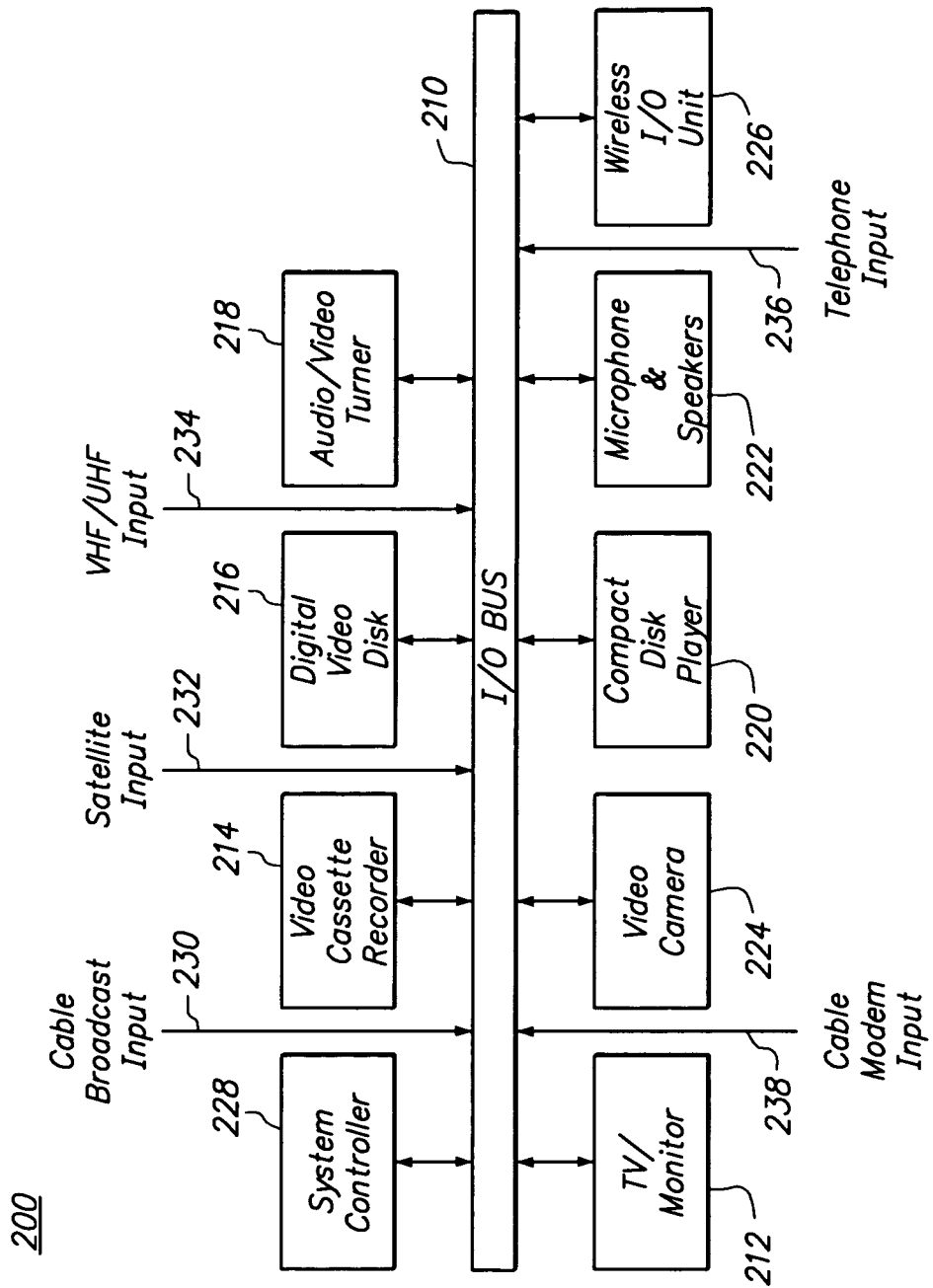
FIG. 2 depicts an exemplary media system in which exemplary embodiments of the present invention can be implemented.

As further illustrated in FIG. 2, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

More details regarding this exemplary entertainment system and frameworks associated therewith can be found in the above-incorporated by reference U.S. Patent Application "A Control Framework with a Zoomable Graphical User Interface for Organizing, Selecting and Launching Media Items". Alternatively, remote devices and interaction techniques between remote devices and user interfaces in accordance with the present invention can be used in conjunction with other types of systems, for example computer systems including, e.g., a display, a processor and a memory system or with various other systems and applications.

Figure 3A:
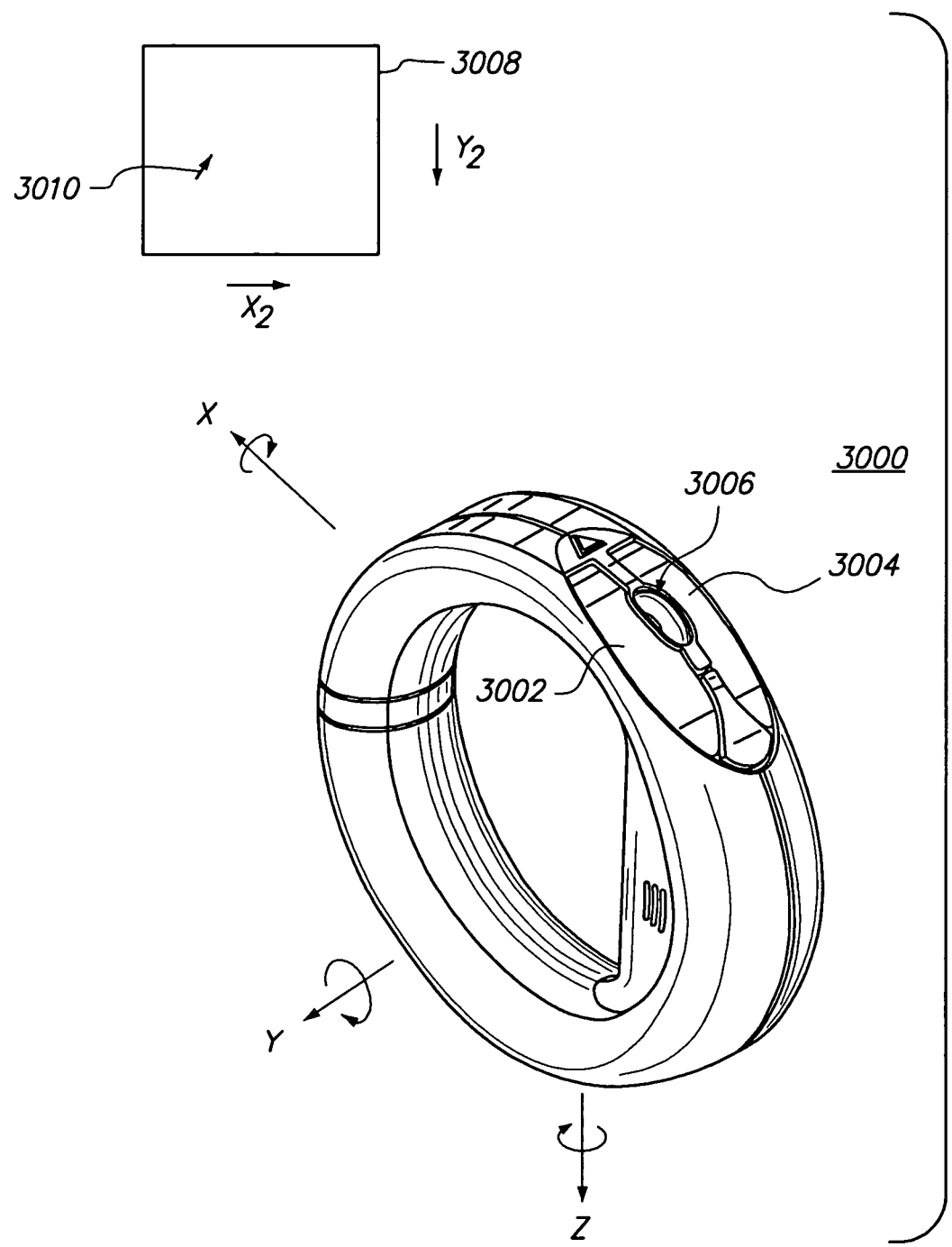
FIG. 3(a) shows a 3D pointing device according to an exemplary embodiment of the present invention.

As mentioned in the Background section, remote devices which operate as 3D pointers are of particular interest for the present specification, although the present invention is not limited to systems including 3D pointers. Such devices enable the translation of movement of the device, e.g., linear movement, rotational movement, acceleration or any combination thereof, into commands to a user interface. An exemplary loop-shaped, 3D pointing device 3000 is depicted in FIG. 3A, however the present invention is not limited to loop-shaped devices. In this exemplary embodiment, the 3D pointing device 3000 includes two buttons 3002 and 3004 as well as a scroll wheel 3006 (scroll wheel 3006 can also act as a button by depressing the scroll wheel 3006), although other exemplary embodiments will include other physical configurations. User movement of the 3D pointing device 3000 can be defined, for example, in terms of rotation about one or more of an x-axis attitude (roll), a y-axis elevation (pitch) or a z-axis heading (yaw). In addition, some exemplary embodiments of the present invention can additionally (or alternatively) measure linear movement of the 3D pointing device 3000 along the x, y, and/or z axes to generate cursor movement or other user interface commands. An example is provided below. A number of permutations and variations relating to 3D pointing devices can be implemented in systems according to exemplary embodiments of the present invention. The interested reader is referred to U.S. patent application Ser. No. 11/119,663, entitled (as amended) "3D Pointing Devices and Methods", filed on May 2, 2005, U.S. patent application Ser. No. 11/119,719, entitled (as amended) "3D Pointing Devices with Tilt Compensation and Improved Usability", also filed on May 2, 2005, U.S. patent application Ser. No. 11/119,987, entitled (as amended) "Methods and Devices for Removing Unintentional Movement in 3D Pointing Devices", also filed on May 2, 2005, and U.S. patent application Ser. No. 11/119,688, entitled "Methods and Devices for Identifying Users Based on Tremor", also filed on May 2, 2005, the disclosures of which are incorporated here by reference, for more details regarding exemplary 3D pointing devices which can be used in conjunction with exemplary embodiments of the present invention.

According to exemplary embodiments of the present invention, it is anticipated that 3D pointing devices 3000 will be held by a user in front of a display 3008 and that motion of the 3D pointing device 3000 will be translated by the 3D pointing device into output which is usable to interact with the information displayed on display 3008, e.g., to move the cursor 3010 on the display 3008. For example, such 3D pointing devices and their associated user interfaces can be used to make media selections on a television as shown in FIG. 3B. Aspects of exemplary embodiments of the present invention can be optimized to enhance the user's experience of the so-called "10-foot" interface, i.e., a typical distance between a user and his or her television in a living room. For example, interactions between pointing and scrolling (as well as zooming and panning), e.g., using a 3D pointing device and associated user interface, can be optimized for this environment as will be described below, although the present invention is not limited thereto.

Referring again to FIG. 3A, an exemplary relationship between movement of the 3D pointing device 3000 and corresponding cursor movement on a user interface will now be described. Rotation of the 3D pointing device 3000 about the y-axis can be sensed by the 3D pointing device 3000 and translated into an output usable by the system to move cursor 3010 along the $y_2$ axis of the display 3008. Likewise, rotation of the 3D pointing device 3008 about the z-axis can be sensed by the 3D pointing device 3000 and translated into an output usable by the system to move cursor 3010 along the $x_2$ axis of the display 3008. It will be appreciated that the output of 3D pointing device 3000 can be used to interact with the display 3008 in a number of ways other than (or in addition to) cursor movement, for example it can control cursor fading, volume or media transport (play, pause, fast-forward and rewind). Additionally, the system can be programmed to recognize gestures, e.g., predetermined movement patterns, to convey commands in addition to cursor movement. Moreover, other input commands, e.g., a zoom in or zoom out on a particular region of a display (e.g., actuated by pressing button 3002 to zoom in or button 3004 to zoom out), may also be available to the user.

Exemplary embodiments of the present invention describe how to create a navigation systems and methods for a use with a graphical user interface (GUI) and which employ scrolling, pointing or some combination thereof to facilitate the navigation experience. Considering scrolling first, note that the scroll-wheel 3006 of 3D pointing device 3000 operates in discrete steps. According to exemplary embodiments of the present invention, the wheel 3006 is spring loaded and provides force feedback for each indexable quantum of rotation, however other methods of providing feedback through the wheel 3006 are also possible. The user receives sensory feedback as the wheel reaches each position; this single step is referred to as a "single click". Two significant factors exist with this indexing capability. The first is that a user can easily and reliably move a single click in either direction. Secondly, a user receives tactile feedback which is more direct then other alternatives, such as visual cues.

Another characteristic of scroll-wheel 3006 is that the scroll-wheel can be rotated at different, user-controlled speeds. It is easy for users to distinguish between, and use, two scroll wheel rotation speeds, which in this specification are designated as "fast" and "not fast". The fast rotation speed can be used in exemplary embodiments of the present invention to take large steps through a set of objects displayed on the user interface. This large step behavior is referred to as "skipping" or "jumping". "Not fast" can include many slower rates of scroll-wheel rotation which are used for taking single steps through a set of objects. This single step behavior is referred to as "visiting a list". The scroll-wheel 3006 has the advantage of being able to move in single steps very accurately. Scrolling can be used to move the cursor from one object to the next very accurately even when the objects are very small. However, the scrolling distance achievable by a user in a single motion is limited by how many click-rotations can be achieved before the user has to lift up his thumb (or finger) and reposition it. This repositioning action is referred to as "clutching".

Another method of navigating with an exemplary handheld device is 3D pointing. The 3D pointing function has the advantage of moving along any vector at high speed. For example, pointing can rapidly move the cursor across the screen on a diagonal. The limitation of pointing is that it can be hard for some users to quickly and accurately reach and maintain a position over a small target, especially if there are a large number of objects (e.g., media items such as movie covers) displayed on, e.g., the television, at a particular time.

All target objects in exemplary GUIs according to the present invention can be reached through either pointing only, scrolling only or some combination thereof. Preferably, the user will be free to use pointing, scrolling or a combination of the two methods without having to undergo a difficult changeover process to switch between modes. According to exemplary embodiments of the present invention scrolling and pointing are integrated, and changing methods is easily performed at anytime. During pointing, objects are highlighted or hovered (referring to a technique whereby an object is magnified when a cursor pauses over that object) when the cursor arrives at the target object. During scrolling, the cursor moves to stay within the currently highlighted target object. Both methods of navigation can be synchronized at all times. The following sections will describe how these functions are achieved in more detail.

Prior to describing these exemplary navigation methods, a brief description of an exemplary GUI is presented. The GUI can contain one or more target objects (also referred to herein as graphical objects or simply "objects"). The target objects can be organized in many different ways on a display such as: (1) single buttons or zoomable objects arbitrarily positioned on the screen, (2) one dimensional lists of buttons or zoomable objects which may be scrollable, (3) two dimensional grids of objects possibly scrollable and pannable, (4) three dimensional matrices of objects possibly scrollable and (5) various combinations of the above. It may be desirable for some GUI objects to be immediately available at all times because of their functionality, while others may be displayed only in response to, e.g., user command or movement of a cursor to a predetermined portion of the display. In the exemplary GUIs described herein, such objects include things like volume control, transport control and communications control.

According to exemplary embodiments of the present invention, scroll-wheel and pointing methods are used by the handheld device to navigate the GUI on a display. A cursor is used to indicate the current location associated with the pointing method. When the cursor enters the area occupied by a selectable object, that object is highlighted. Highlighting is visible through a color change, a hover-zoom effect, or any other visual method that makes the object distinguishable from other objects on the display. The highlighted object is the object on the GUI that has the focus of both the user and the system. A "select" button, e.g., one of the buttons on 3D pointing device 3000, can be associated with the current highlighted (or focused) object to enable the user to actuate, or otherwise further interact with, that object.

According to one exemplary embodiment of the present invention, scrolling takes place beginning with the last highlighted object. Pointing or scrolling may be used to arrive at this position. Moving the thumb in a top-to-bottom direction over the scroll-wheel causes the cursor to move in a left-to-right or a top-to-bottom direction. Moving the thumb in a bottom to top direction over the scroll-wheel causes the cursor to move in a right-to-left or a bottom-to-top direction. Scrolling movement takes place on whole objects in a discrete fashion, e.g., one click of the wheel moves to the adjacent whole object.

In any view, e.g., a discrete GUI display screen of objects, according to exemplary embodiments of the present invention, objects are assigned a scrolling order. The order is typically an approximation of top to bottom and left to right within the graphical layout, although some GUI screens may have functionality that suggests a different scroll order. Scrolling can traverse objects in a forward or reverse order depending on the direction of scroll-wheel rotation. Additionally, the scrolling sequence wraps around for collections of objects which bridge GUI screens. For example, in the forward scrolling direction the next object visited on the new screen after the last on the previous screen will appear at the top left. In the reverse scrolling direction the next object visited on the new screen after the first on the previous screen will appear at the bottom right. Scrolling causes the next object to be highlighted. When a user rotates the scroll-wheel one index position then, at that point in time, the currently highlighted object is the object which was previously the next object in the scrolling order for that view. Scrolling also moves the cursor to the current highlighted object, thereby keeping both pointing and scrolling synchronized on the same object.

Figure 4:
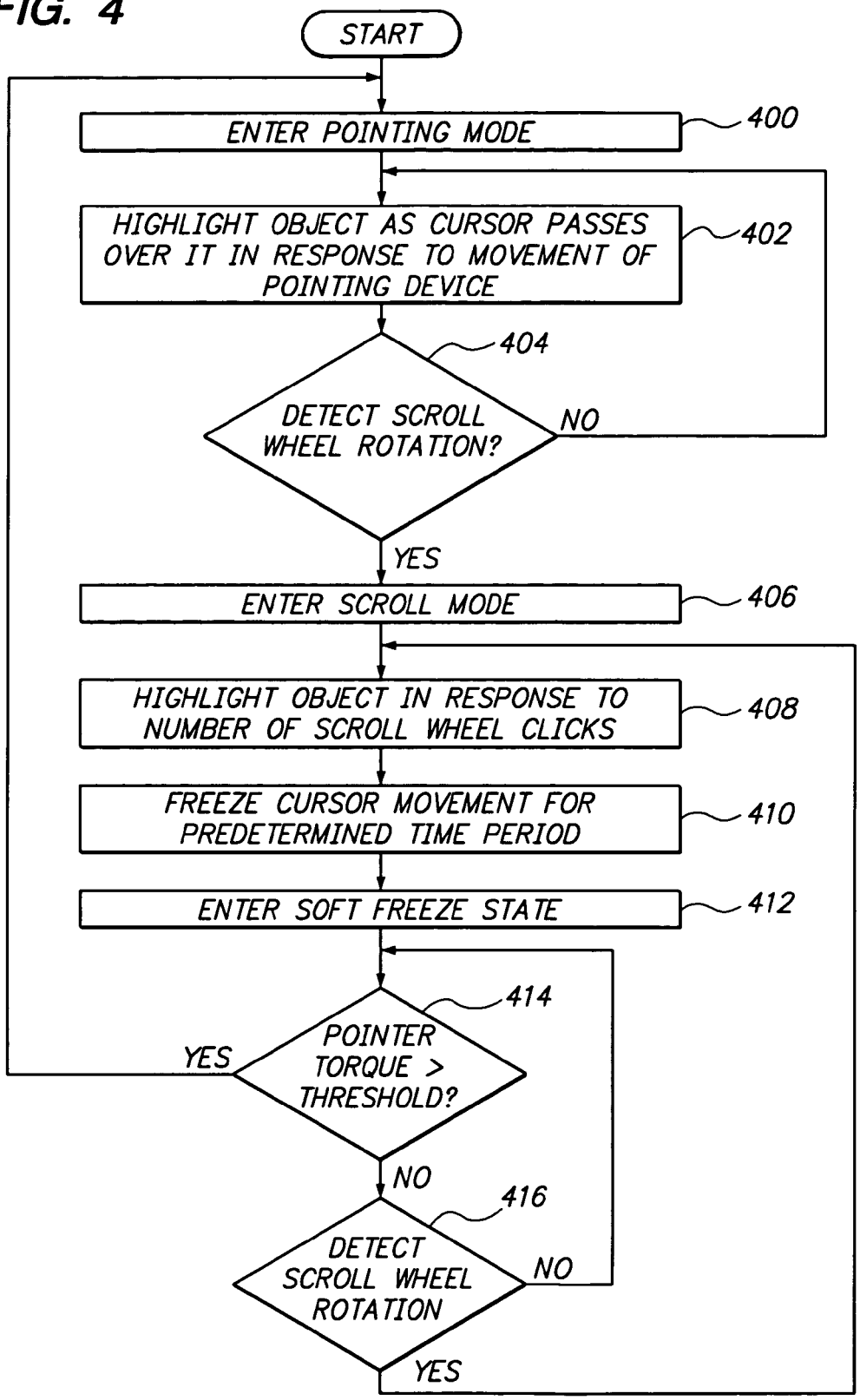
FIG. 4 is a flowchart describing a navigation method according to an exemplary embodiment of the present invention.

As previously described, exemplary navigation systems according to the present invention have both a pointing mode and a scrolling mode. The system automatically determines whether the pointing mode or the scrolling mode is in effect at any time. When the scrolling mode is in effect, the pointing mode can be disabled. This exemplary determination function allows the system to avoid the confusion of the two methods attempting to operate at the same time. Since the determination function is automatic, the user is not necessarily aware of one mode temporarily being disabled in favor of the other mode. Additionally, the exemplary navigation systems and techniques allow for easy and automatic switching between modes which will be described in further detail below with respect to the flow chart of FIG. 4.

Therein, at step 400, the process begins with entry into the pointing mode. It should be noted, however, that according to other exemplary embodiments of the present invention, the default mode could be the scrolling mode. While in the pointing mode, the user interface can highlight objects as the cursor passes over them (either directly or in response to a subsequent user input, e.g., a button press) at step 402.

According to exemplary embodiments, rotating the scroll-wheel triggers the entry into scroll mode at step 404. The cursor is moved to the new highlighted object (408) and frozen for a short period of time, preferably less than one second, e.g., 300 ms, at step 410. This hard freeze period can be included after the rotation of the user's scroll-wheel because users are apt to move the handheld device (in particular 3D pointing devices) to some degree when rotating the scroll-wheel which could cause inadvertent pointing of the handheld device. Additionally the time period used for the hard freeze should be short enough to be unperceivable by the user, although this is not required.

When the hard freeze period expires, the cursor enters a soft freeze state at step 412. This soft freeze state aids the user to keep the highlighting on the last scrolled target object even if his or her hand moves slightly while holding, e.g., a 3D pointing device 3006. In the soft freeze state the cursor remains frozen (relative to pointing, not scrolling) but can be "tugged" loose when the torque applied by a user exceeds a predetermined threshold. In this context the term "torque" generally refers to the amount of force applied by the user to move the handheld device 3006. Thus the torque threshold can, for example, be expressed as a function of movement over time relative to the mass of the handheld device 3006. The amount of torque required to free the cursor from the scrolling mode in the soft freeze state (and to then enter the pointing mode) should be large enough to prevent inadvertent pointer movement from causing object reselection while at the same time being small enough that it does not hamper the user in changing cursor position when desired. In exemplary implementations, the predetermined torque threshold can be set in the user interface software as either a velocity (e.g., angular velocity) or an acceleration threshold (e.g., angular velocity over time) for a handheld device 3006 having a known mass. For example, using one exemplary handheld device 3006, trials found that a setting of 25 degrees/s (or, alternatively, a change in handheld device 3006's output of 25 mickeys/s) was enough to allow the cursor to be parked when desired yet still remaining very easy to tug loose. For example, with a setting of 25 degrees/s a user was able to tug the cursor loose with a wrist rotation of approximately 8 degrees in 0.16 seconds moving from left to right. In a second trial with the same exemplary threshold, the user was able to tug loose with a wrist rotation of approximately 5 degrees in 0.14 seconds moving from right to left. In a third trial with this exemplary threshold, the user was able to tug loose with a wrist rotation of approximately 5 degrees on the vertical axis in 0.2 seconds. The torque setting needed to tug the cursor loose can be adjusted, even to the point of making the setting so low that the user may not even be conscious that it exists. The predetermined torque threshold may be modified through the user interface and may, optionally, be settable by the user to enable them to personalize the sensitivity between scrolling and pointing.

Regardless of the manner in which the soft freeze torque threshold is implemented, the system checks, at step 414, to determine whether torque associated with movement of the pointing device is greater than the threshold. If so, the flow returns to step 400 and the system enters pointing mode once again. Otherwise, there is a check performed at step 416 to determine whether the scroll-wheel has been rotated. If so, then the flow returns to step 408 wherein cursor movement is determined as part of the scroll mode operation. If not, then the system remains in its soft freeze state until either the user provides enough torque to indicate a return to pointing mode, or the scroll-wheel is rotated again.

According to another exemplary embodiment of the present invention, users can use scrolling alone to operate the system. Scrolling can reach all selectable target objects, or in other words, all selectable objects are members of the scrolling list. Certain objects, such as the transport controls described below, are not always visible on the screen, however, transport controls (and all other objects not currently visible) are members of the scrollable list. Continued scrolling will at some point make the object visible. Depending upon the quantity of targetable objects, different methods of scrolling are available. For single objects and small groups scrolling to each one in turn is easy to accomplish. For larger lists, a user will most likely find it to be undesirable to have to scroll through every item on the list. Two scroll-wheel gestures are defined according to exemplary embodiments of the present invention to be used to traverse through larger lists. The two gestures are fast scrolling and jump scrolling.

High speed (or fast) scrolling is used to traverse long lists. According to exemplary embodiments, the system detects the high speed of rotation of the scroll-wheel and can then skip over some objects, which is particularly effective for moving across a large block of channels for channel selection. The pointing mode is disabled during high speed scrolling. Fast scrolling can be used when a user wants to move quickly through a large number of objects by using the scroll-wheel. Fast scrolling is triggered when the time between scroll-wheel indexes occur less than a predetermined short period of time, e.g., 20 ms, apart. The nominal number of objects to skip could be a factor of ten, or it could depend on content, or the nominal number of objects to skip could depend upon the number of visible objects in a list. For example, consider a GUI screen which displays a channel list containing six visible objects. When in fast scrolling mode, fast scrolling would jump six objects per fast click. In another example, a two dimensional grid contains 24 visible objects, so fast scrolling would jump 24 objects per click. In fast scrolling mode the first visible object of the newly paged group is highlighted. The above examples for short period of time and nominal number of objects to skip are purely illustrative, and can be modified as desired.

Jump scrolling is another method for navigating through large groups or lists. Jump scrolling allows a user to skip over the remainder of one group in order to reach another item in a different group. A jump-forward and jump-back wheel gesture moves past all remaining items in the current group and continues on to whatever object is next. According to one exemplary embodiment of the present invention, to jump-forward the gesture comprises scrolling back one object (e.g., one click of the scroll wheel 3006) followed by scrolling forward. According to another exemplary embodiment of the present invention, to jump-back the gesture comprises scrolling forward one object followed by scrolling back. When the system detects either of these patterns the system will perform the jump scroll according to this exemplary embodiment.

According to exemplary embodiments of the present invention, an example of jump scrolling will be described as shown in FIGS. 5(*a*) and 5(*b*). FIG. 5(*a*) shows two groups of objects. Group 102 is a vertical group comprising six items. Group 104 is a scrollable, pageable two dimensional grid containing twenty four items (but could contain many more items). In this example, the jump-back method is described to scroll from the currently highlighted object, Show8, within group 104 to the last visible member of the vertical group 102, i.e., object "13". The effect of this function is a scroll-jump over the set of objects labeled Show2 through Show7 in order to arrive at the lower left object "13".

FIG. 5(*b*) illustrates the jump back sequence. The top most panel 302 shows the beginning of the sequence where scroll-rotation moved the cursor from Show9 304 to Show8 306. This action is scrolling in a backwards direction. The second panel 308 shows that the user continued to scroll backwards to Show7 310. At this point in the example, to demonstrate the jump-back method, an action is performed to scroll right (or forward) one position to Show8 306 on the third panel 312. Also as seen on the third panel 312, after the cursor is scrolled to Show8 306, a jump-back arrow indicator 314 is displayed in the Show7 box 310. The jump-back arrow indicator 314 provides visual feedback that the system is primed to perform a jump-back if the user scrolls to object Show7 310. The fourth panel 316 shows a picture of what the screen would look like upon scrolling back one object and activating the jump-back function. This can be seen by comparing box8 318 with box7 320 which shows that the system has moved the cursor past (behind) all of the members of the initial group.

The jump-scroll pattern works in the forward direction as well according to exemplary embodiments of the present invention. To activate the jump-forward function while scrolling in a forward direction, scrolling back one item, and then scrolling forward one scroll-wheel click causes a jump forward. As described in the jump-back method, the jump forward method will skip all objects in the current group and the cursor will move accordingly. Additionally, scrolling over two or more objects in the same direction resets the scroll jumping pattern.

Thus far, the description has focused on general pointing/scrolling interaction and some special scroll functions. Next, these interactions will be discussed in the context of specific (yet still illustrative) user interfaces and/or GUI screens.

Figure 6:
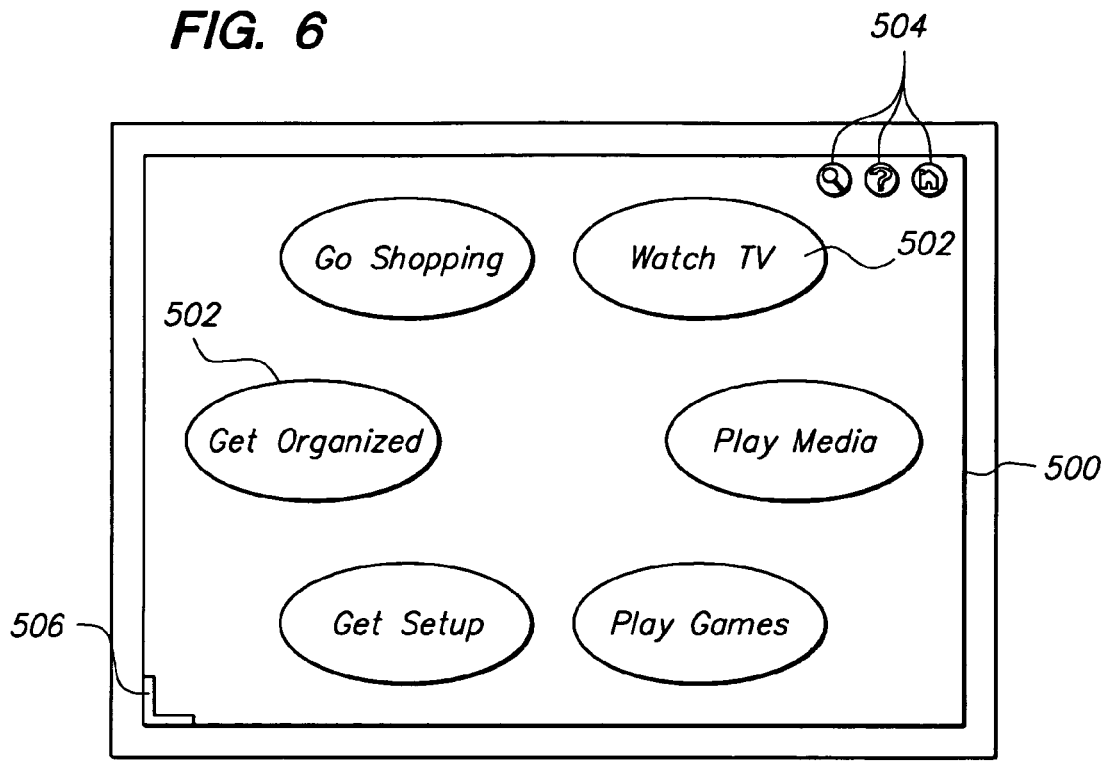
FIG. 6 shows a Circle-of-Icons view according to an exemplary embodiment of the present invention.

For example, according to another exemplary embodiment of the present invention a Circle-of-Icons view is displayed, as illustrated in FIG. 6, and navigable with either a scroll-wheel, 3D pointing or some combination thereof. This circular layout can be used for the home screen 500 of a user interface or in other cases where the quantity of user choices is limited. The exemplary home screen 500 contains six major application buttons 502, global navigation buttons 504 and a communications control hot-spot 506. Not all objects are necessarily visible on each screen, such as communications control and transport control, which are not shown in FIG. 6. Using pointing behavior, the invisible objects can be made visible by performing a pointing gesture that moves the cursor to a particular location on the screen, such as a corner or a side. To use scrolling to make the objects visible and accessible, continued scrolling will display and enable the object when that object is reached by the cursor because all of the objects are part of the scrollable list according to this exemplary embodiment.

Figure 7:
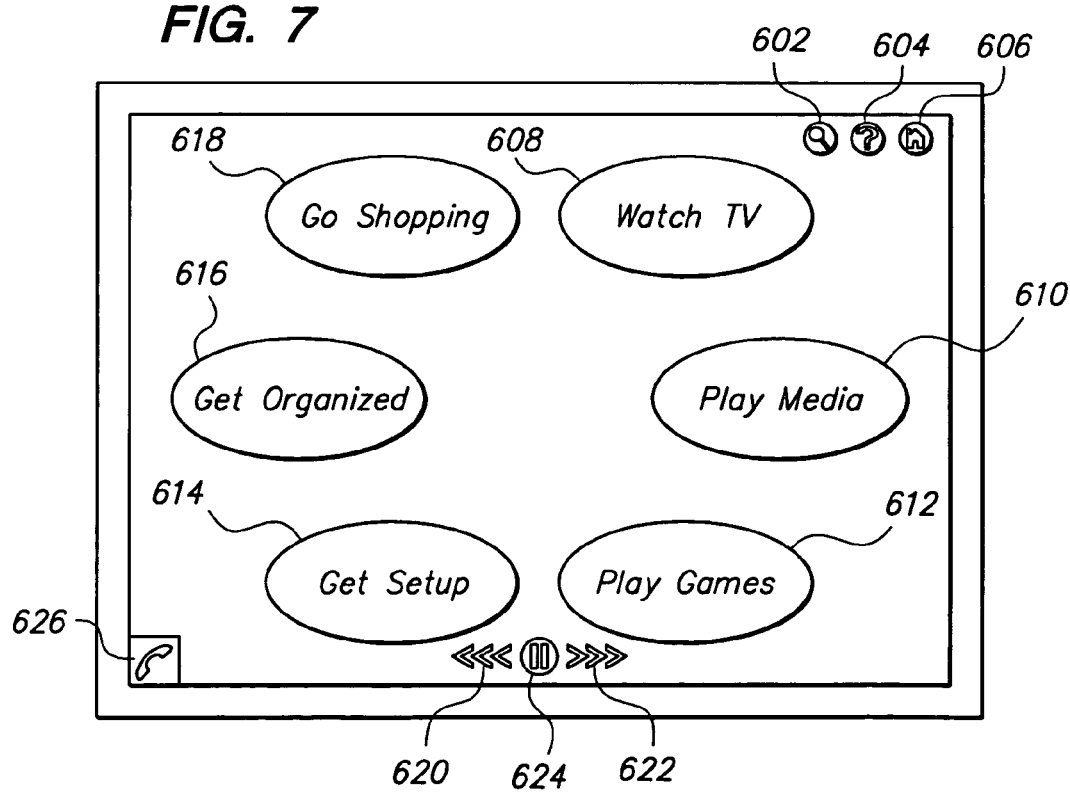
FIG. 7 shows a Circle-of-Icons view with scrolling order according to an exemplary embodiment of the present invention.

FIG. 7 enumerates the scrollable objects in visiting order, additionally all scrollable pop-ups are shown (not just the normally visible objects) in this Figure. For example, comparing FIG. 6 with FIG. 7 reveals that FIG. 6 does not show the communications control object 626 (just the hot spot indicator 506) nor does it show the transport control objects 620, 622 and 624. In their scrolling order, the objects shown in FIG. 7 are global navigation icons 602, 604 and 606 (which are visible at most times), objects 608, 610, 612, 614, 616 and 618 are major application buttons to transition to their appropriate zoomable views, objects 620, 622 and 624 are transport control objects (and are usually invisible) and object 626 is the communications control object, which is visible only during an alert or when highlighted. Communications control object 626 can expand into a mini-view overlaying part of the current screen, and selecting the mini-view zooms into the full communications view (not shown). Thus, when a user powers-up the user interface, if scroll mode is immediately entered, the first selected object will be navigation icon 602, the next forward scroll-wheel index will result in navigation icon 604 being selected etc., in the afore-mentioned order. If on the other hand, the user interface is initially in pointing mode, and, for example, a user selects the "Play Media" button 610 and then enters scroll mode, the next scroll forward index by the user of scroll wheel 3006 would result in the "Play Games" button 612 being selected.

Figure 8:
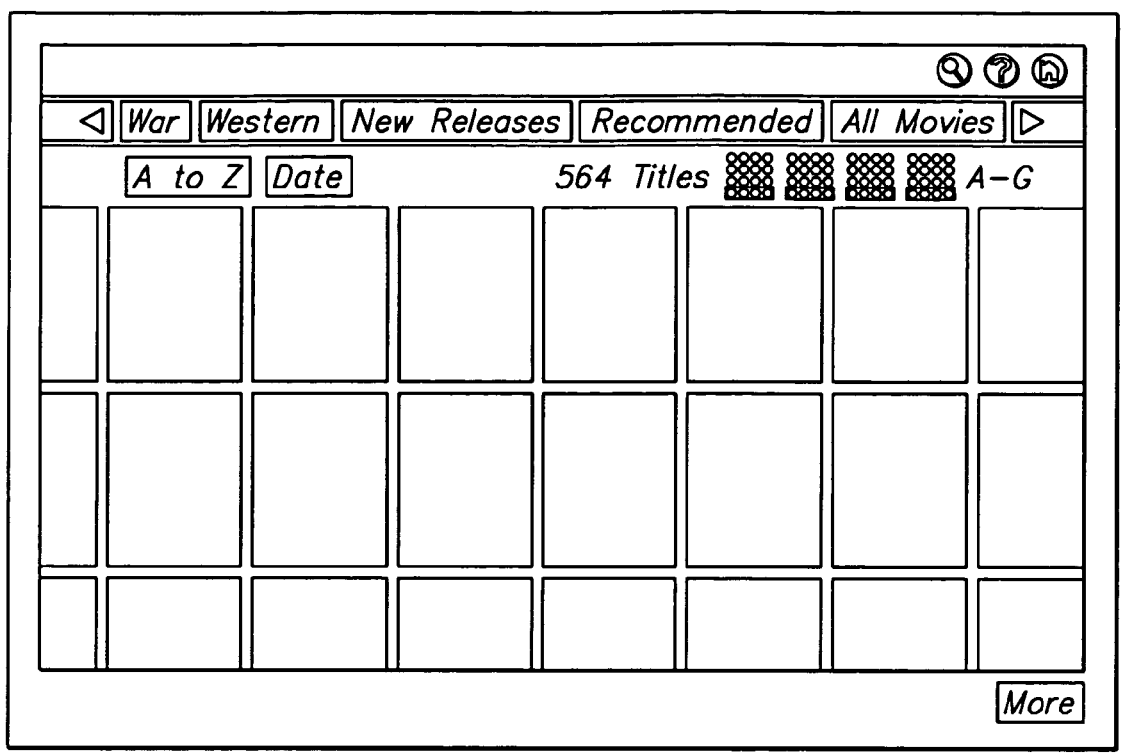
FIG. 8 shows a New Releases view according to an exemplary embodiment of the present invention.

According to another exemplary embodiment of the present invention, another type of view exists entitled a New Releases View as shown in FIG. 8. This New Releases View is representative of a view that provides a visual browser for a categorized set of objects and can be used when there are too many objects in the group to be viewed at once. This view also is an example of a two dimensional, zoomable, pannable, scrollable and pageable layout view. Several graphical interaction methods are used to manage and navigate the set of objects and will be described below.

These graphical interaction methods include: (1) global navigation buttons, (2) scrolling lists of categories, (3) control of sort order by date or alphabetically, (4) page index indicating relative position within the total set of objects, (5) pannable, pageable and zoomable two dimensional grid, and (6) a 'more' button to control paging. "Pan", "pannable" or "panning" as these terms are used herein refer to the progressive translating of a displayed object or objects (or a portion thereof) that gives the visual impression of lateral movement in the image. Additionally, other methods could be used or variations and combinations of the above graphical interaction methods. Some common denominators exist for this type of layout, for example, according to one exemplary embodiment all objects are arranged into a scrollable list no matter how complex the layout or lengthy the list.

Figure 9A:
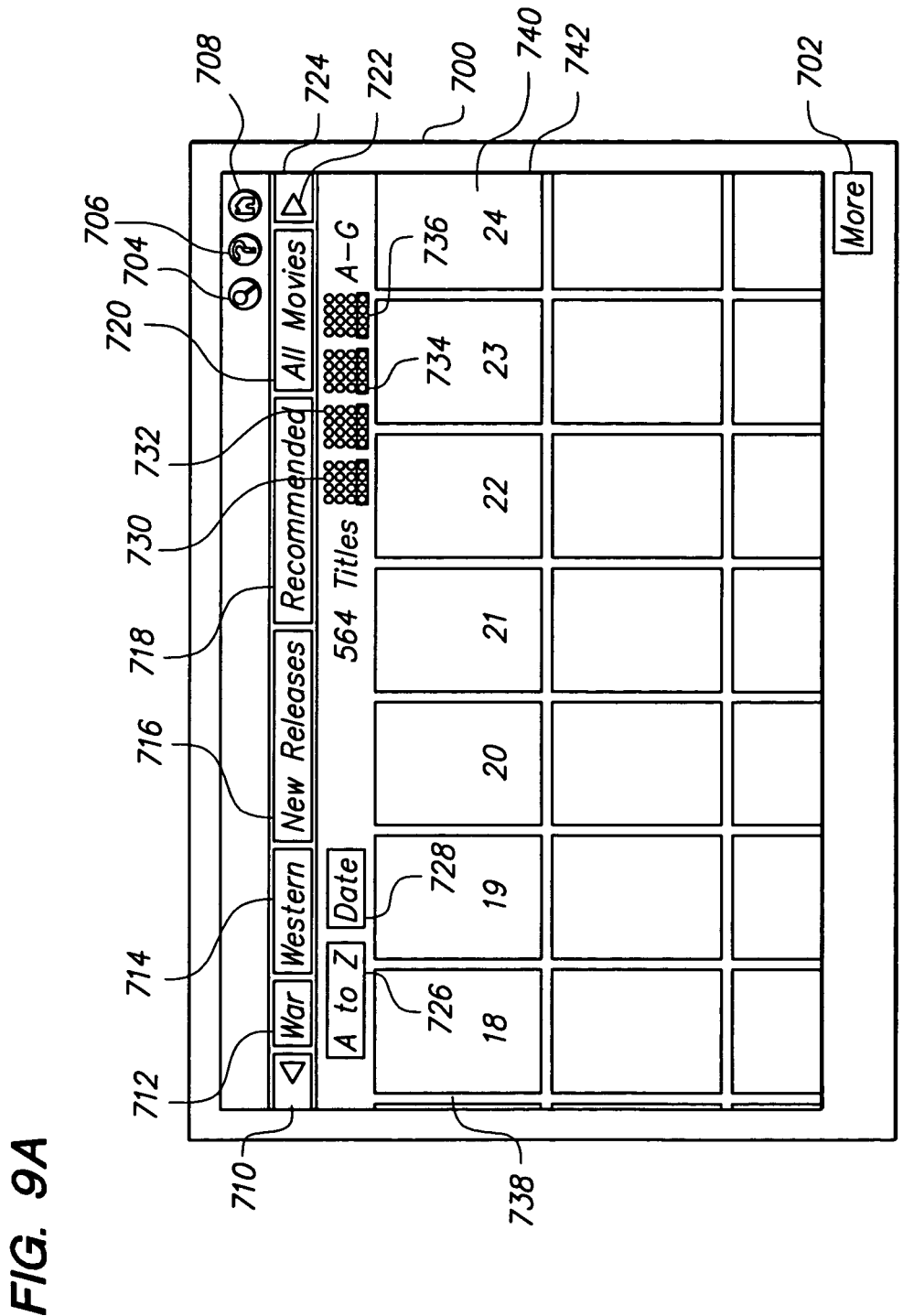
FIG. 9(a) depicts a New Releases view with scrolling order according to an exemplary embodiment of the present invention.
Figure 9B:
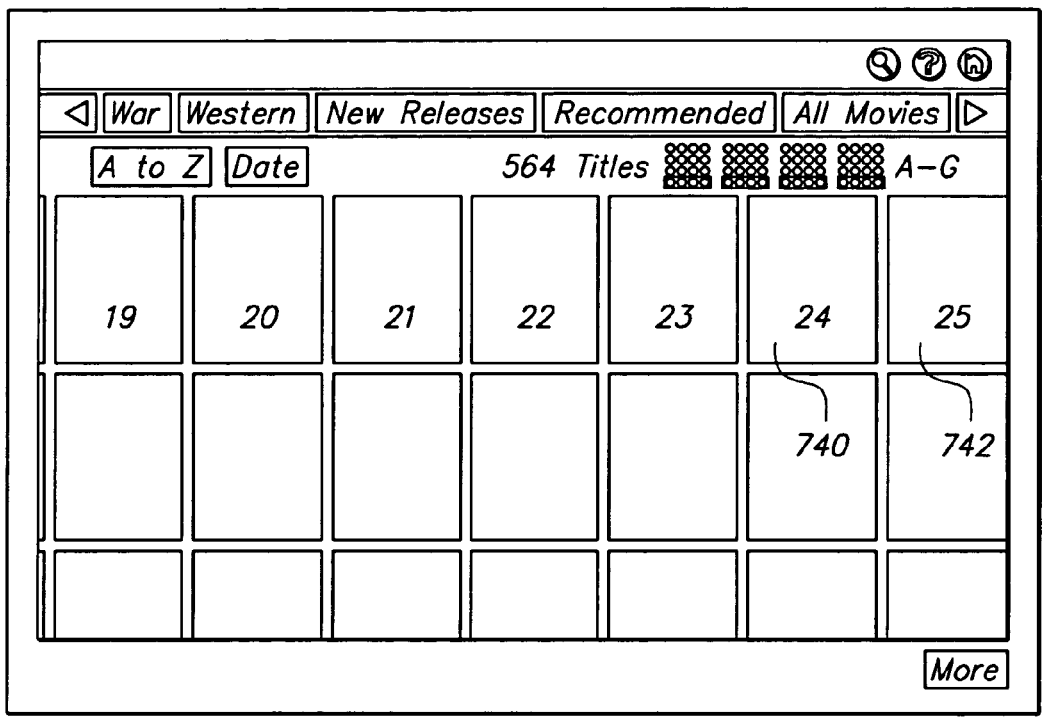
FIG. 9(b) depicts the result of a scrolling induced horizontal pan of the New Releases view of FIG. 9(a) according to an exemplary embodiment of the present invention.

Referring to FIG. 9(*a*), the left-most object 704 in the upper-most row is the first icon in the scrolling order for the GUI screen of FIG. 9(*a*) and the last visible object in this layout 700, is the 'more' button 702. The scroll function scrolls through the objects on this page in the following scroll order. The currently visited object is highlighted. Transport control (not visible) followed by communications control (not visible) are the last objects in the scrollable list following the 'more' button 702 in this example. Scrolling begins with the left-most button in global navigation 704 and proceeds through the rest of the global navigation buttons 706 and 708. The next logical grouping of buttons is the horizontal scrollable objects list of categories numbered 710, 712, 714, 716, 718, 720, 722 and 724. Horizontal scrollable object 724 is not visible on the screen. Scrolling to object 724 will automatically cause the horizontal scrollable widget to scroll one position to the right causing the object to become visible. In the example depicted in FIG. 9(*a*), object 724 is the last object in the horizontal scrollable objects list of categories. After scrolling to object 724 the next visited object is the 'AtoZ' button 726 (in response to a forward scroll click). In FIG. 9(*a*) for example, a left click over the 'AtoZ' button 726 would highlight and trigger the sort function associated with the 'AtoZ' button. An additional sort button 'date' 728 is provided, however numerous other sorting options could be provided.

The next group of objects is the 'page index' group, numbered 730, 732, 734 and 736. Scrolling to and selecting any one of these objects causes the corresponding page to be displayed in the two dimensional grid area starting with object18 738. The two dimensional grid is a pannable page of objects, e.g., movie covers, albums, etc. Scrolling continues from left to right until it reaches object24 740. Object25 742 is not currently visible, but scrolling to object 742 will cause the grid to pan to the right. Upon scrolling to object 742 of FIG. 9(*a*), the panning operation would present a screen as seen in FIG. 9(*b*) where object25 742 is now visible. The pan to the right exemplified here is the same graphic animation that would take place if the user pointed into this area.

Figure 10:
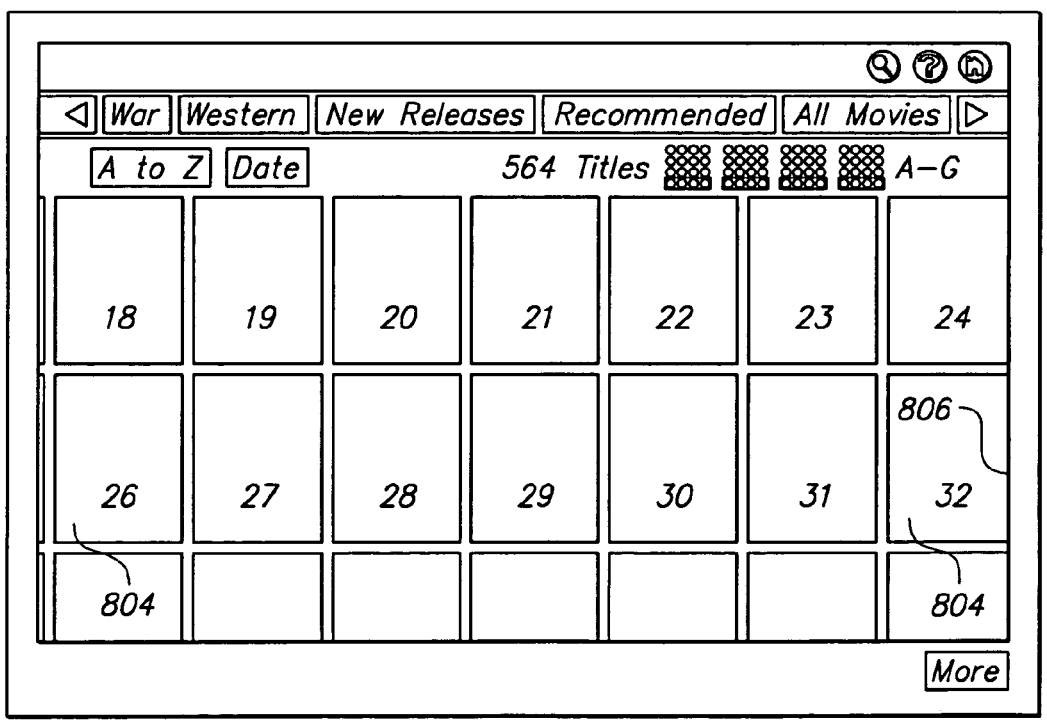
FIG. 10 depicts a New Releases view with scrolling order according to an exemplary embodiment of the present invention.
Figure 11:
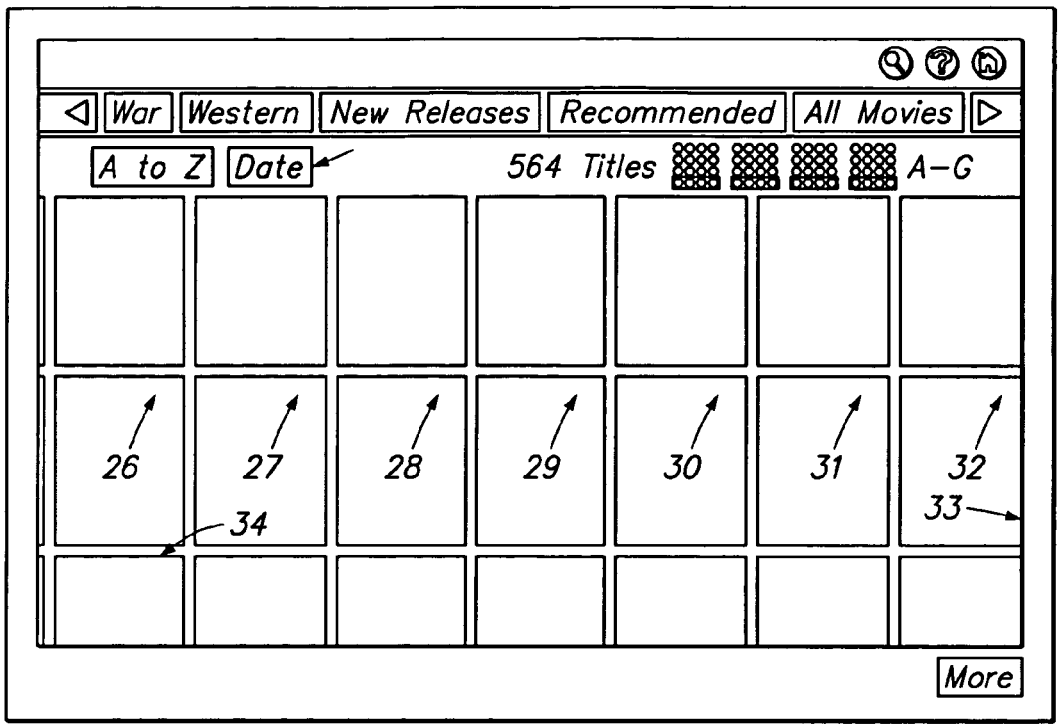
FIG. 11 depicts a New Releases view with scrolling order according to an exemplary embodiment of the present invention.
Figure 12:
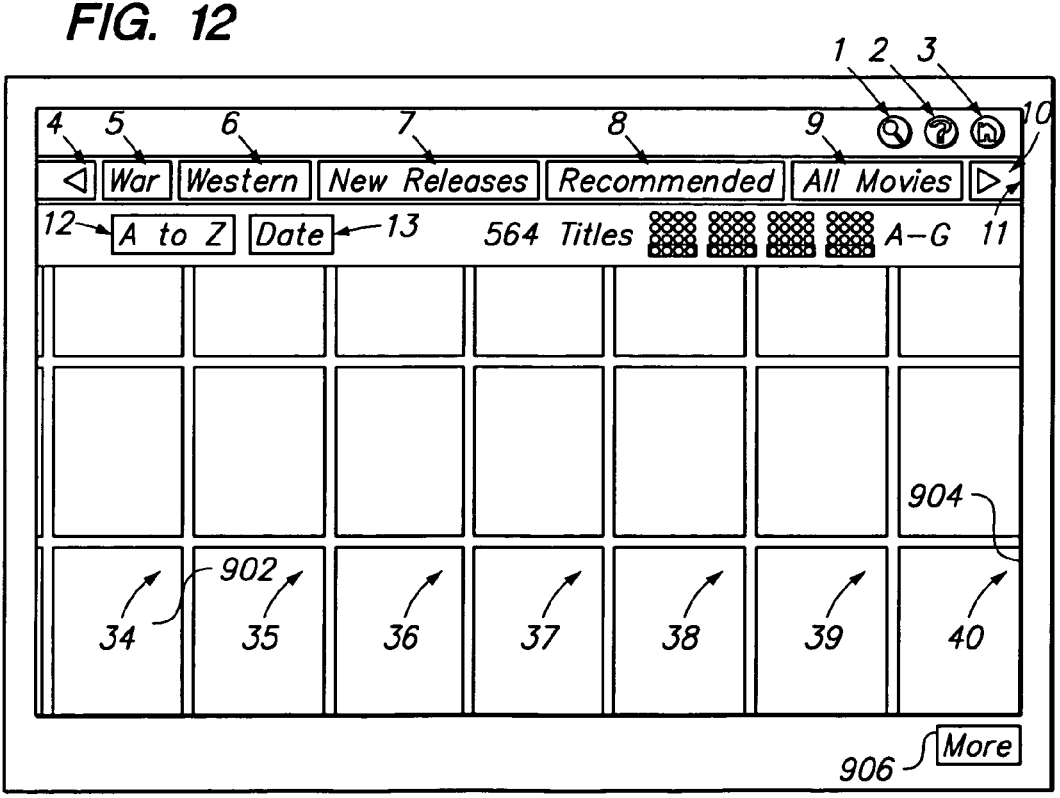
FIG. 12 depicts a New Releases view with scrolling order according to an exemplary embodiment of the present invention.
Figure 13:
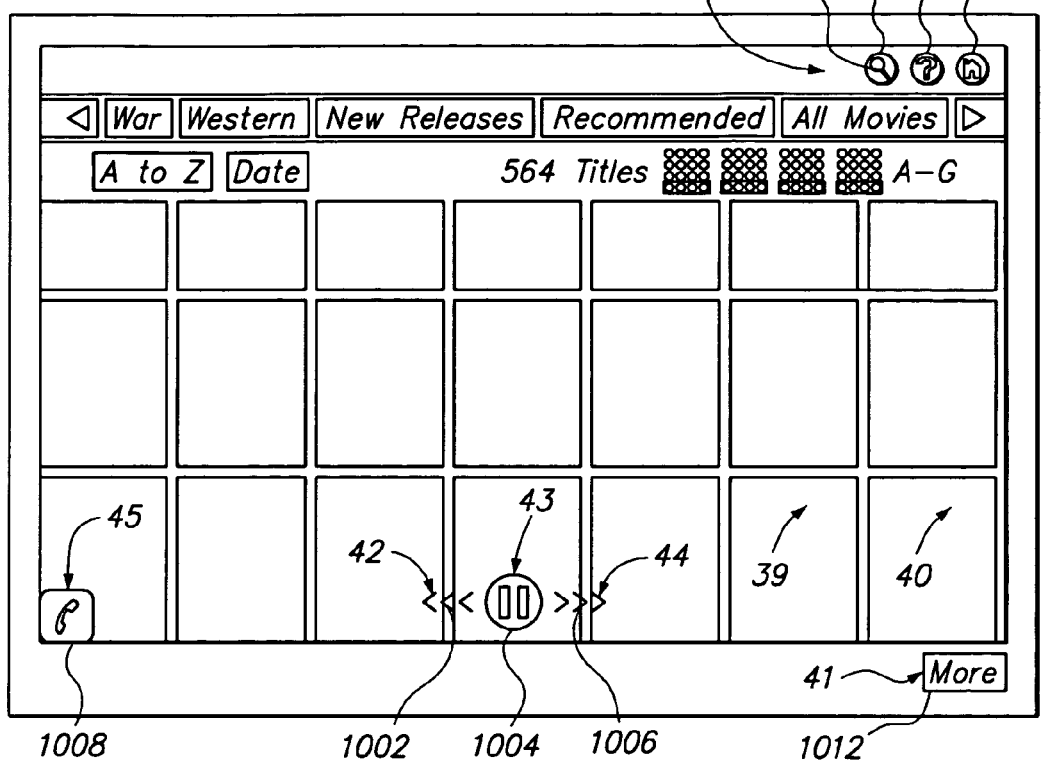
FIG. 13 depicts a New Releases view with scrolling order according to an exemplary embodiment of the present invention.

Object25 742 (not visible) is the right most object in the first row of the grid. Continuing this example and also referring to FIGS. 9-13, scrolling forward one scroll-wheel click to object26 802 causes the grid to pan, which makes object26 802 visible and highlighted as seen in FIG. 10. Scrolling continues left to right to object32 804. Object33 806 is not visible, but continued scrolling to object33 806 causes the grid to pan in the same fashion described above for object25 742 of FIGS. 9(a) and 9(b). If the user then scrolled one more object forward to object34 902 in FIG. 11, the screen would pan both vertically and horizontally to put all of object34 902 on the screen as shown in FIG. 12. In this example, object40 904 is the last object in this group, which makes the 'more' button 906 the next scrollable item when scrolling forward therefrom. Continued forward scrolling brings up the rest of the transport control objects 1002, 1004 and 1006 followed by the communications control 1008 and then a return (or wrap around) to the global navigation objects as depicted in FIG. 13. The first global navigation object 1010 would have two scroll list numbers internally in the system, which are derived from the first scrollable item and the last scrollable item (1 and 46 in this purely illustrative example).

According to one exemplary embodiment of the present invention, scrolling past the end of the page does not automatically trigger the 'more' button function. Instead, the user needs to select the 'more' button 1012 to turn the page. According to an alternative embodiment of the present invention, the page would be turned automatically when scrolling past the last item on the page, rather than wrapping back around to the first global navigation object.

If there were only two pages of items in this portion of the user interface, then scrolling to the end of the second page would bring the highlighting to the 'more' button 1012 and then on to transport control. If there were many pages it would be undesirable to force the user to have to scroll through them all just to reach transport control. This is another example of an instance where the jump scroll function described above can be used to enable a user to quickly and easily navigate through the system.

Figure 14:
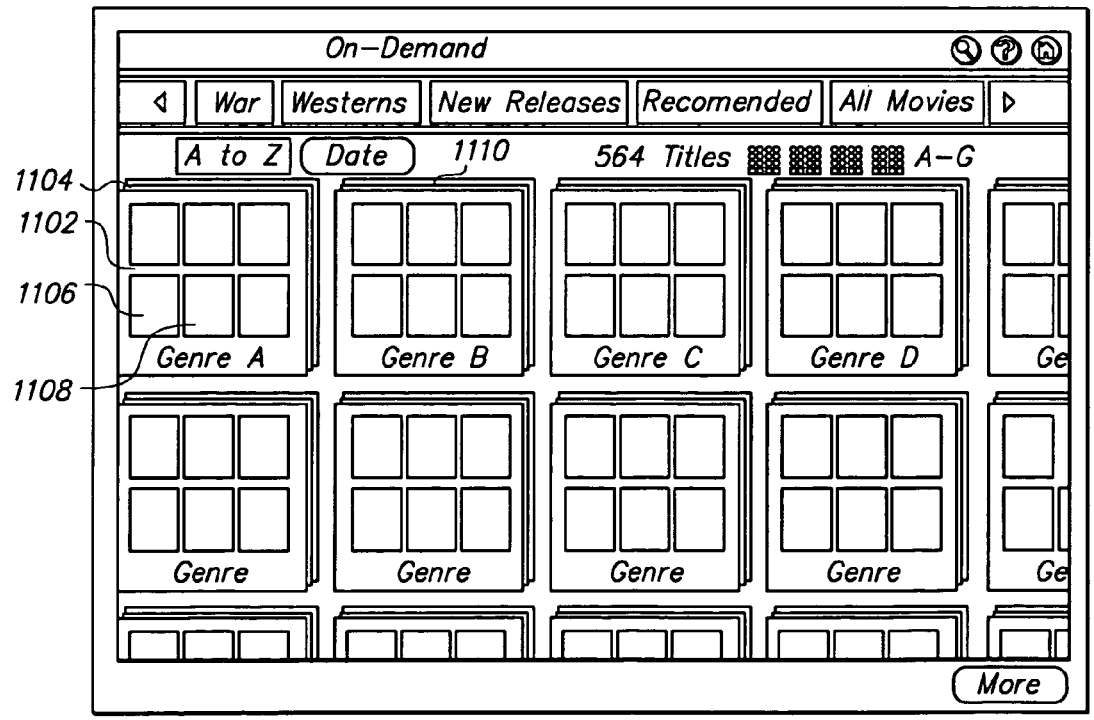
FIG. 14 shows an On-Demand view according to an exemplary embodiment of the present invention.

According to another exemplary embodiment of the present invention, objects can be presented in an on-demand view as seen in FIG. 14. This on-demand view is a 3D view, with the third dimension being visually indicated by the double shadow 1104 of each group 1102. In the example shown in FIG. 14, the displayed level of view scrolling takes place at the group level. Representative items 1106 and 1108 are shown within a group 1102, but these representative items 1106 and 1108 are not directly selectable. A single forward scroll click will move the target object from the first group 1102 (Genre A) to the next group 1110 (Genre B).

Figure 15:
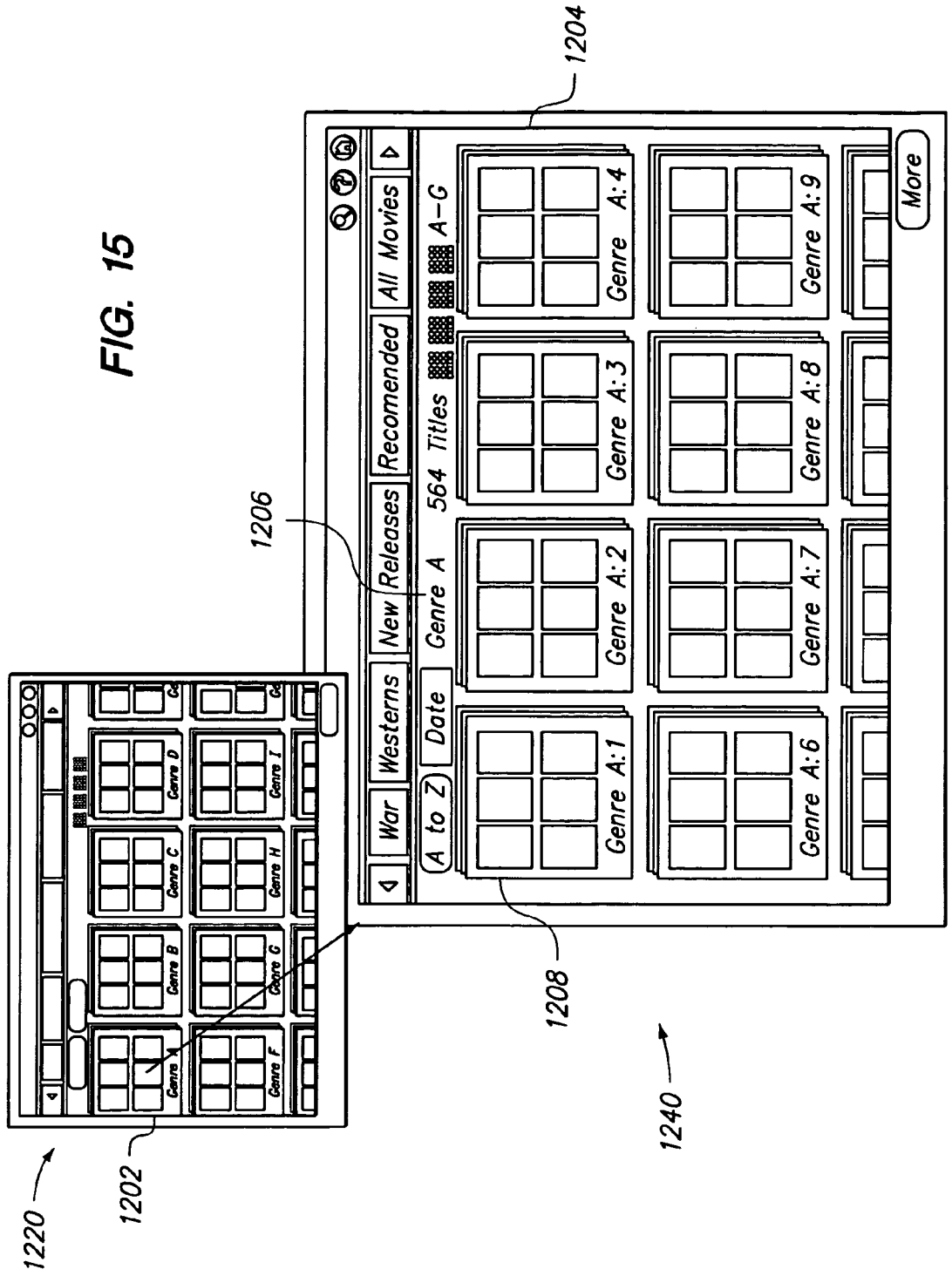
FIG. 15 depicts zooming into a sub-group in an On-Demand view according to an exemplary embodiment of the present invention.

Selecting one of the groups will zoom into that group. As illustrated in FIG. 15, having selected group Genre A 1202, the display zooms from a first view 1220 to a second view 1240 into the group of objects 1204. In various exemplary embodiments of the present invention, the terms "zoom" or "zooming" refer to the progressive scaling of a displayed navigation object (or a portion thereof) that gives the visual impression of movement of all or part of a display group toward or away from an observer. In other words, the zooming feature causes the display of the navigation element or navigation object to change from a distant view to a close view, and vice versa, as though the end user were manipulating a telescope, a magnifying glass, or a zoom lens of a camera. Alternatively, the zooming feature may enable the navigation system to display a plurality of navigation objects at a relatively low resolution on one display screen, one navigation object at a relatively higher resolution on another display screen, and a plurality of navigation sub-objects (corresponding to one navigation object) at yet a higher resolution on yet another display screen. Zoom or zooming can also include progressive scaling of the displayed objects along with the addition or subtraction of displayed information from one view to the next, e.g., something other than a "pure" camera zoom. Returning to FIG. 16, the parent group title 1206 is provided to indicate that the current view is a nested subgroup. Object 1208 in the displayed sub-group does not have a double shadow which indicates that there are no hidden objects or nested sub-groups associated with object 1208. Additionally the scrolling process at this display level, functions in the same manner as the scrolling process does at the parent level.

According to exemplary embodiments of the present invention, there is a detail view with scrollable categories and a detail view with an integrated text entry search. FIG. 16 illustrates the scroll order for a detail view with scrollable categories. In the detail view with scrollable categories, when scrolling, not all items are selected going from left to right prior to moving in a vertical direction. For example, after scrolling through the genre options, the selected object is the Go button 1302 (associated with Matt Damon). The next scroll wheel click would travel downward and highlight Go button 1304 (associated with Julia Styles) instead of traveling horizontally to Buy Now button 1306. The decision for which object is the next selectable object is automatically performed by the system. Additionally these Go buttons can be easily reached through scrolling even when they are relatively small. FIG. 17 illustrates the combination of text entry search integrated with a detail view that contains no large pageable groups. The scrolling sequence of objects for this particular view is illustrated by the numbered arrows 1-44.

Figure 18:
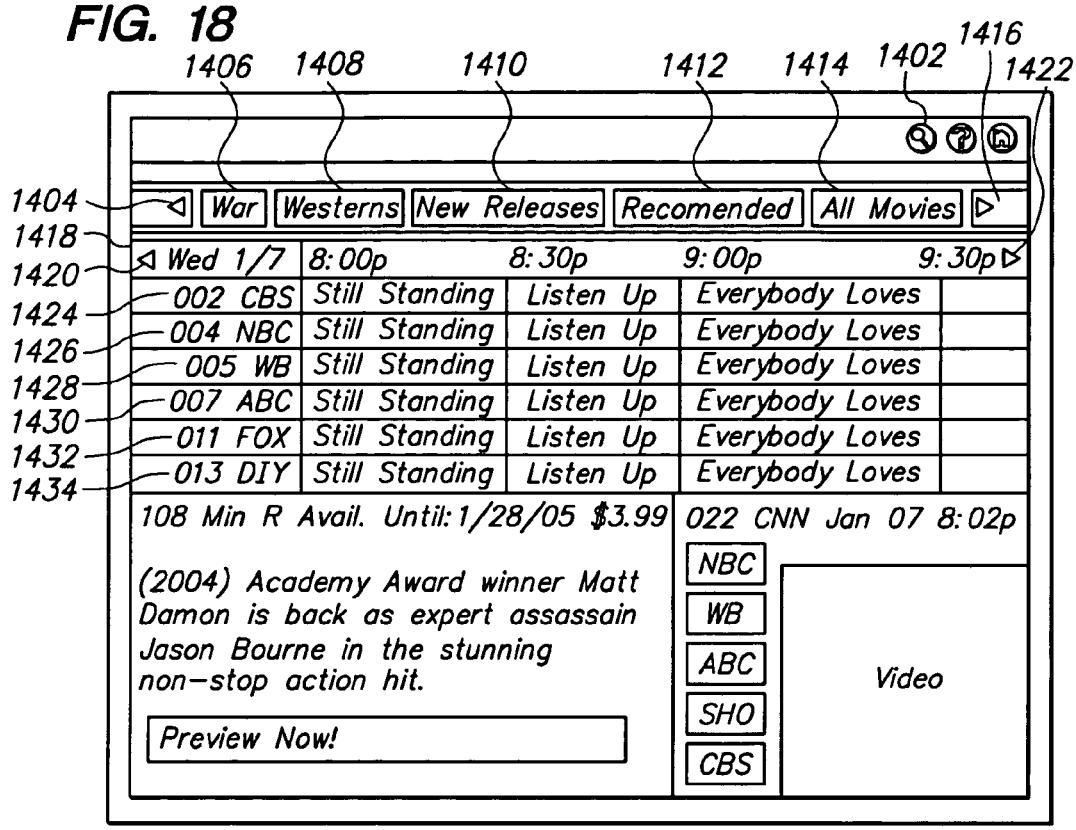
FIG. 18 shows an electronic program guide in a 2D grid view according to an exemplary embodiment of the present invention.

According to another exemplary embodiment of the present invention, an electronic programming guide (EPG) is displayed in a 2D grid view, and contains multiple groups of objects, several of which are scrollable, pageable and pannable as illustrated in FIG. 18. The scrolling order for this view is from left-to-right and top-to-bottom. Scrolling starts from wherever the cursor has been last positioned. As in other views previously described, the default starting cursor position is the left most Global Navigation icon 1402. The next group of objects is the horizontal scrollable list of categories, objects 1404 through 1416. This horizontal scrollable list contains arrow buttons at both ends to initiate scrolling using the pointing mode of the 3D pointing device 3006. For the purpose of consistency the arrow buttons are included in the scroll list. To move past this group, the user simply scrolls through all of the items or uses the pointing mode. Scrolling past item 1416 will trigger an automatic pan of the objects in the horizontal slider (when there are more objects in the horizontal slider). When the user reaches the last object, further forward scrolling will cause the cursor to move to the second row which contains the date and time horizontal slider 1418. In the example illustrated in FIG. 18, the number of categories is fairly small. Because of this fairly small number of categories the scroll-jump gestures can, optionally, be disabled. However, in other embodiments of either small numbers of groups or large numbers of groups the scroll-jump gestures described above could be enabled.

Figure 19:
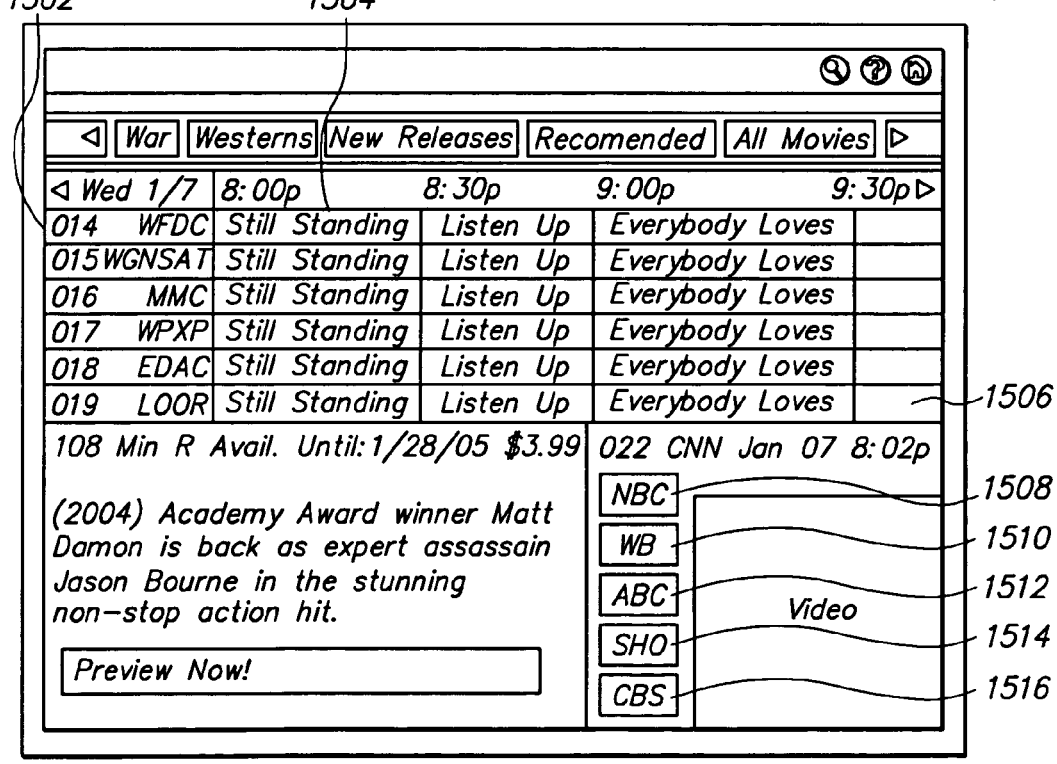
FIG. 19 shows an electronic program guide in a 2D grid view according to an exemplary embodiment of the present invention.

Continuing the example from above and illustrated in FIG. 18, the date and time horizontal slider 1418 contains arrow buttons 1420 and 1422 which move the grid horizontally in increments of 30 minute columns. According to one exemplary embodiment of the present invention, approximately fourteen days of information is available at any given time, however those skilled in the art will appreciate that this could vary. In this example the group is too large for the user to scroll through all of the items at any given time and the most popular portion of the grid is the information describing events within an hour and a half of the current time. Therefore, the grid depicts more information for an hour and a half block, and the timeline will pan only when the arrow buttons are pressed. This allows the user to quickly scroll past the visible objects in the timeline to reach the channel number group along the left side. The channel number group is a vertically scrollable list containing several hundred to several thousand items. The visible items will be whichever channels were last brought into view. The default position will be at the beginning of the list starting with channel number two. The visiting order in the channel number group is labeled 1420 through 1434. Scrolling past the last visible item in the list (item 1434) will trigger a page-down to higher numbered channels. This page-down causes the next set of objects to become visible, beginning with the next logical item 1502 as shown in FIG. 19.

Figure 20:
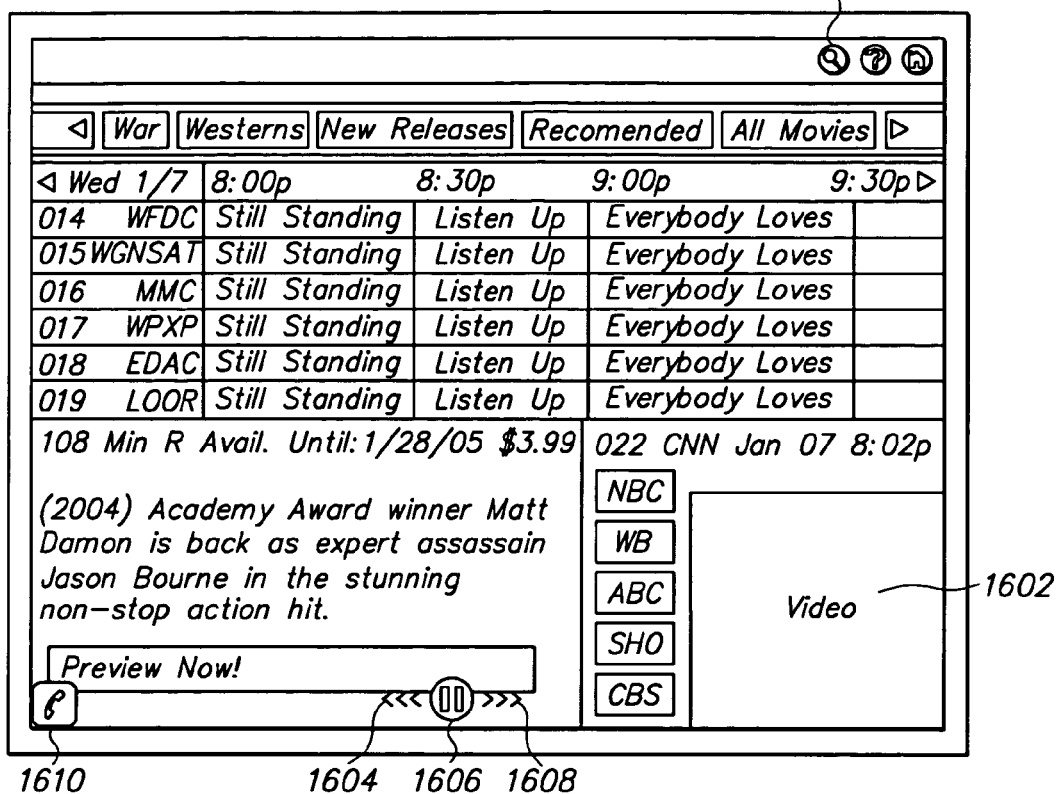
FIG. 20 shows an electronic program guide in a 2D grid view according to an exemplary embodiment of the present invention.

The scrolling and paging process continues until the end of the channel list. In the situation where the user does not want to scroll through the entire list, the user can perform a pointing gesture to move off of this group or the user can perform a scroll-jump as described above. Jumping forward brings the cursor to the two dimensional grid of 'show names' starting in the upper left labeled object 1504. Scrolling proceeds from left-to-right and top-to-bottom within the two dimensional group of visible 'show names'. When the cursor reaches the bottom right item 1506, the next forward scroll-wheel click will trigger a page-down. A page-down will display the next twenty four half-hour segments. The next item in sequence is positioned in the upper left of the two dimensional grid. This paging sequence continues through the end of the channel list. Additionally the user can use pointing to move off of this group or use the scroll-jump behavior previously described. Scroll jumping from the two dimensional grid, will move the cursor to the next visited object which is the quick-pix list item 1508. Scrolling forward proceeds through the quick-pix list, items 1510 through 1516. Since the quick-pix list is short and not pannable, the scroll-jump feature can be disabled. Referring to FIG. 20, the next item visited after quick-pix is the scaled video region 1602, in which a reduced size version of the video stream currently selected in the electronic program guide can be displayed.

The transport control and communications control are on the end of the scroll list as on other layouts. According to the exemplary embodiment displayed in FIG. 20, transport control contains three items which are visited left to right, items 1604, 1606 and 1608. The communication control zoomed-out view is a single small icon 1610. Selecting the icon will zoom into an expanded view showing the five types of communications. Scrolling forwards past the communications control icon 1610 will move the cursor back to the top left-most item in global navigation 1612. Scrolling backwards from the top of the layout will move the cursor back to the communications control icon 1610 in one scroll-wheel click rotation. The above described examples dealt with scrolling in a forward direction, rotating the scroll-wheel in the opposite direction will reverse the sequence.

Figure 21:
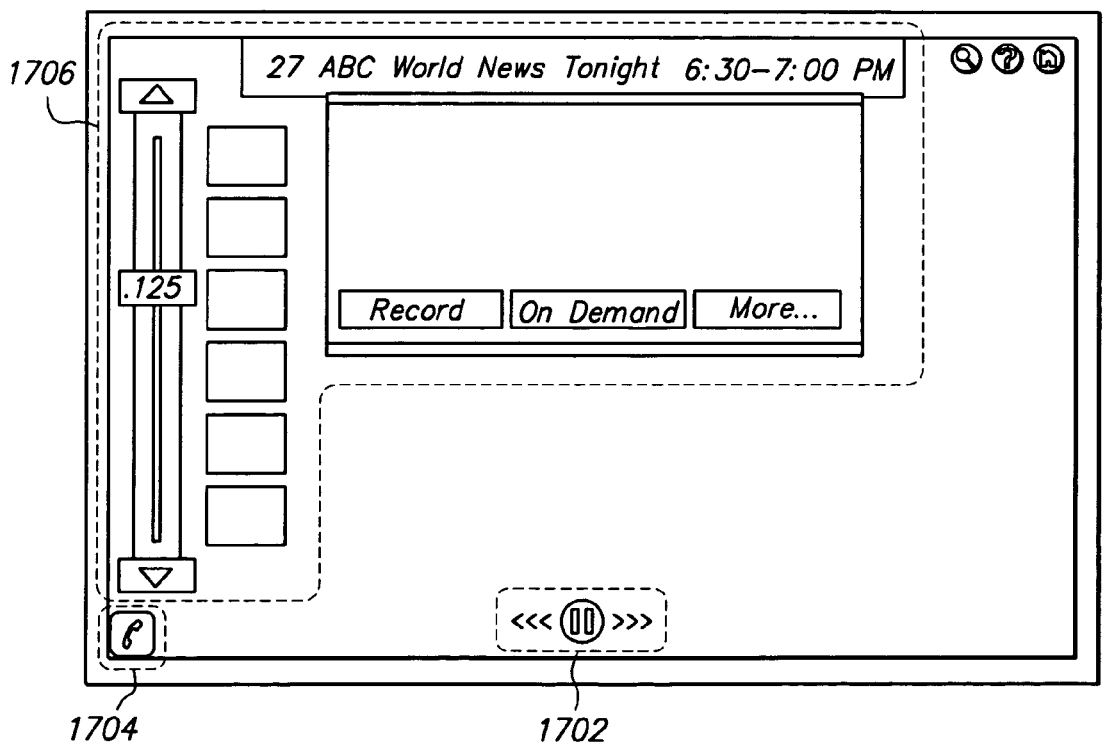
FIG. 21 illustrates a full screen video view according to an exemplary embodiment of the present invention.

According to another exemplary embodiment of the present invention, the screen layout can be a full screen video view (Live TV) as shown in FIGS. 21-26. This GUI screen can be reached within the user interface in a number of different ways. For example, it can be reached directly by selecting the "Watch TV" application button in the home screen of FIG. 7. Alternatively, it can be reached by selecting one of the programs from the electronic program guide of FIG. 20. Note also that in FIGS. 21-26 the displayed objects are those which can be displayed as overlays on the live video feed. The live video feed itself is not shown in these Figures to simplify the illustrations. However, according to exemplary embodiments of the present invention, in the full screen video views, the amount of video covered up by the controls is minimized. To achieve this objective of minimizing the amount of video covered by controls, controls become visible in functional groups. The functional groups are as follows: (1) channel control with metadata browser 1706, (2) transport control 1702, (3) communications control 1704 and (4) global navigation. Note that while FIG. 21 shows all four control groups as being visible, that will not typically be the case.

Figure 22:
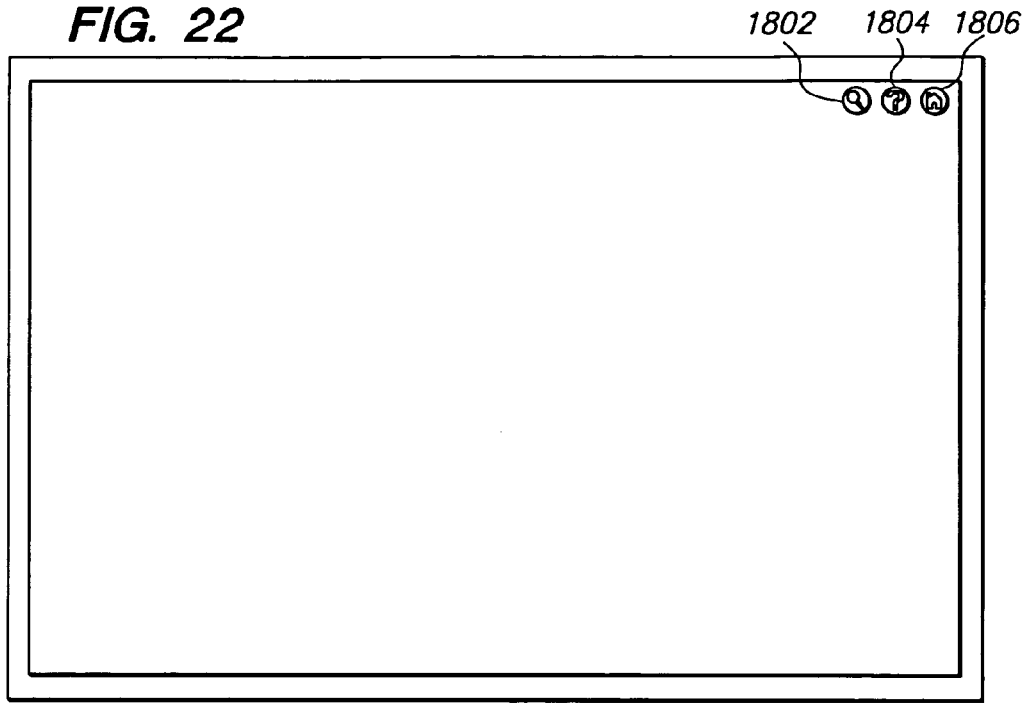
FIG. 22 illustrates the Global Navigation controls on a full screen video view according to an exemplary embodiment of the present invention.

When only video is showing on the screen, the first scroll-wheel click will highlight the left-most button 1802 of the Global Navigation and succeeding forward scrolling will proceed through the other navigation buttons 1804 and 1806 as illustrated in FIG. 22. Even the Global Navigation controls 1802-1806 can be displayed with a high degree of translucency to minimize their impact on the live video feed, e.g., television channel output or movies. The next forward scroll-click will cause channel control with the metadata browser to appear over the video as shown in FIG. 23.

Figure 23:
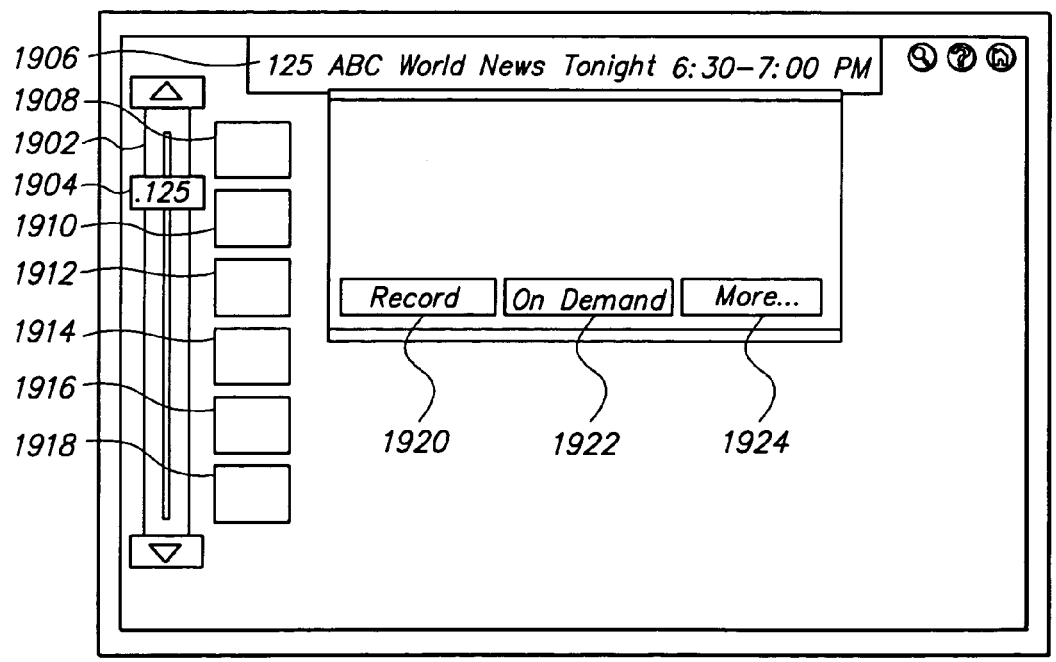
FIG. 23 shows the scrolling sequence for channel control and the metadata browser on a full screen video view according to an exemplary embodiment of the present invention.

FIG. 23 displays the scrolling sequence for the channel control and the metadata browser. The first selectable item (after the global navigation group) is the channel number scroll bar 1902 (channel slider). A left button click over the channel slider 1902 brings the system into slider mode. In slider mode, the scroll-wheel moves the vertical channel slider 1902 and changes the channel number 1904 on the slider bar, as well as changing the contents in the metadata browser 1906. Channel number scrolling starts with the last channel selected. If the user causes channel control to become invisible the last channel selected will be the channel number displayed the next time channel control becomes visible. This may also change the tuner, affecting the video in the background. In an alternate embodiment, a different mapping would require a user to actively choose to change the tuner by, for example, a left button click. This different mapping would allow the user to browse the metadata of other channels without affecting the video in the background. To exit slider mode, the user performs a right button click. Forward scroll-wheel rotation will then proceed through the quick-pix list (items 1908 through 1918). The next forward scroll-wheel click will then reach the 'record' button 1920 in the metadata browser. Scrolling past the 'more' button 1924 will cause the channel control and metadata browser to become invisible as well as causing the Transport Control brick to become visible as seen in FIG. 24.

Figure 24:
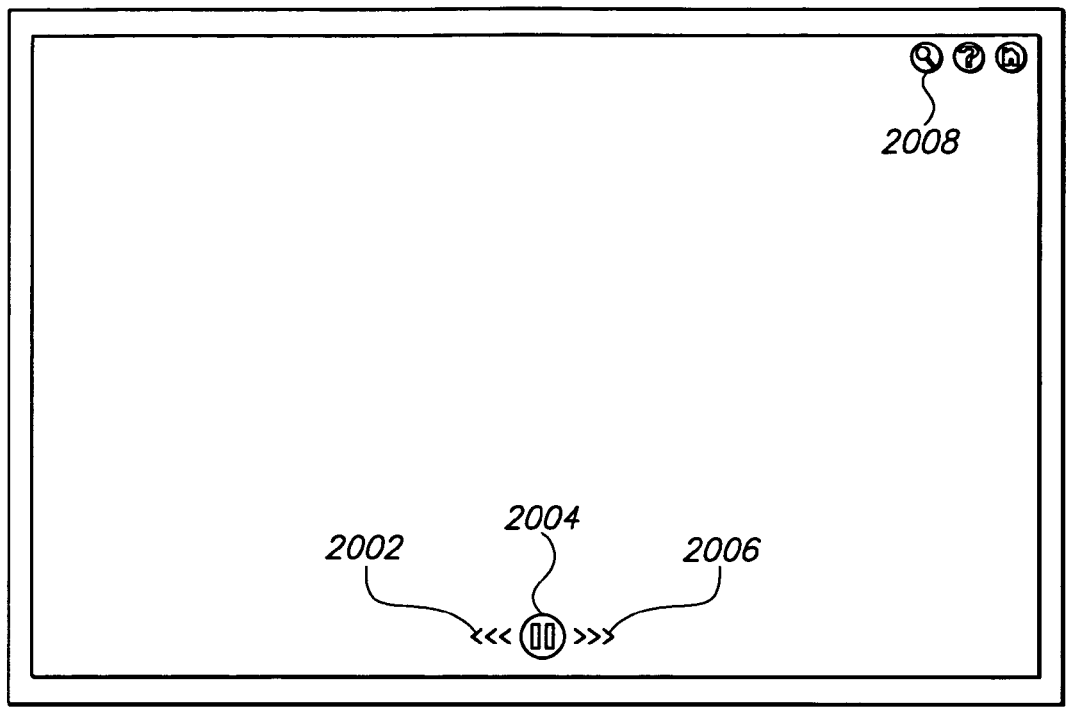
FIG. 24 depicts the Transport Control icons on a full screen video view according to an exemplary embodiment of the present invention.
Figure 25:
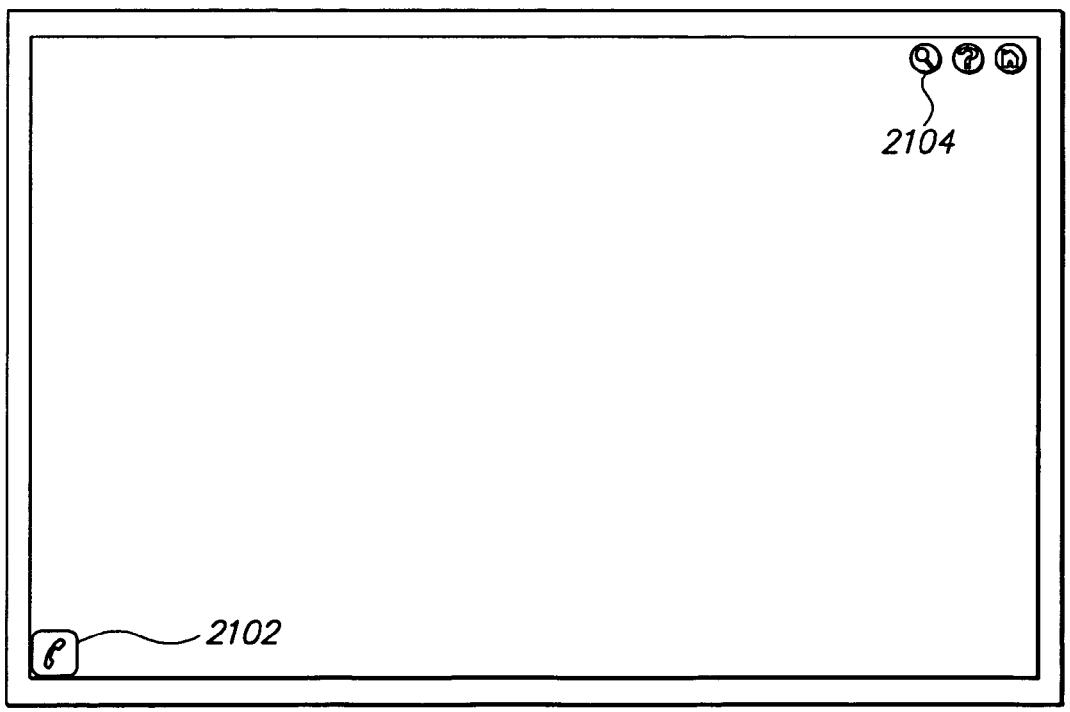
FIG. 25 shows the communication control icon on a full screen video view according to an exemplary embodiment of the present invention.

The transport control depicted in FIG. 24 contains three buttons 2002, 2004 and 2006. The scroll sequence for the Transport Control is from left to right. In this exemplary embodiment, from the left-most global navigation button 2008, Transport Control can be reached quickly by scrolling backwards two clicks. Scrolling forward past item 2006 will cause transport control to become invisible and cause the communications control icon 2102 to become visible as illustrated in FIG. 25.

Communications control 2102 is typically the last item in the scrollable sequence. A scroll-wheel click forward from communications control 2102 will bring the cursor back to the first global navigation icon 2104. According to various exemplary embodiments of the present invention allow for hot corners or hot sides which allow a cursor to be placed in a certain location to make a control visible, or to have the control icons only made visible through scrolling, or some combination thereof. An alternate exemplary embodiment would provide a mapping solution that provides a singular hot corner. For example, pointing into the bottom left corner would cause the communication control icon 2102 to become visible. When communication control icon 2102 is visible, one scroll-wheel click backwards would reach channel control and one scroll-wheel click forwards would reach transport control. This method provides rapid access to all controls. Additionally, once the controls become visible pointing or scrolling can be used to operate the controls.

Figure 26:
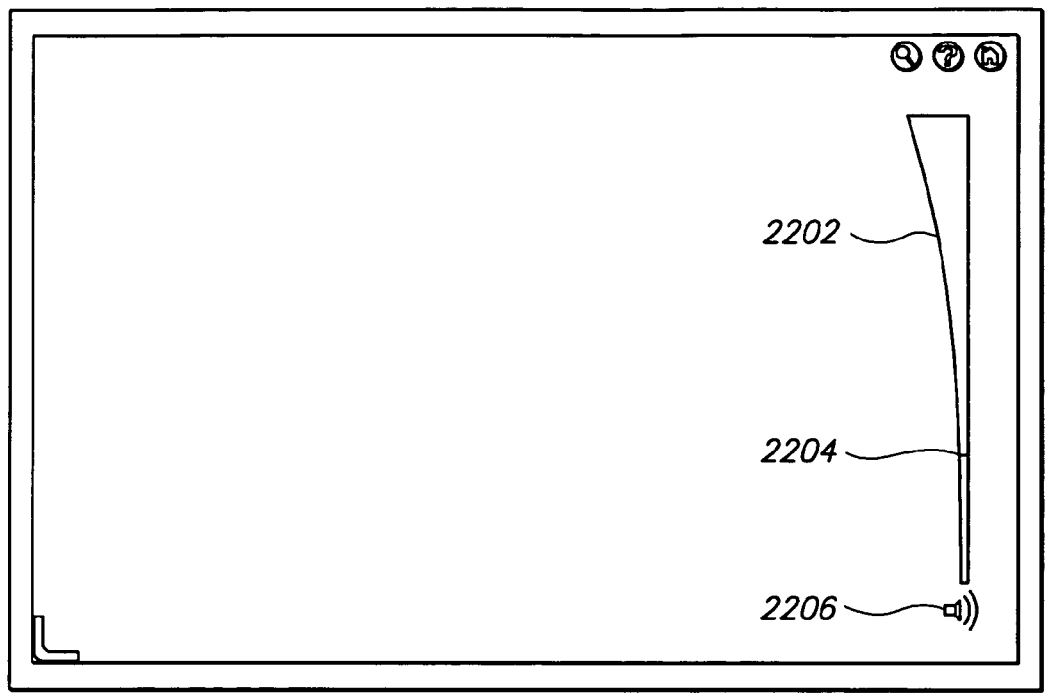
FIG. 26 depicts the volume control according to an exemplary embodiment of the present invention.

According to exemplary embodiments of the present invention, the scroll-wheel can be used as a button to toggle the visibility of the volume control object 2202 displayed in FIG. 26 and to enter the scroll-wheel volume adjust mode. A scroll-wheel button click causes the volume control object to appear on the screen. The cursor 2204 is positioned over the last volume setting on the control widget. Scrolling the wheel while in the scroll-wheel volume adjust mode moves the cursor 2204 up or down which adjusts the volume. While in the volume adjust mode, a left button click will toggle the mute button. Clicking the scroll-wheel button a second time will cause the volume control object to become invisible, leaving the scroll-wheel volume adjust mode, and will return the cursor to the position it was on prior to the first scroll-wheel button click. The user can use a pointing behavior to move the cursor at any time. This action is achieved by simply tugging the cursor loose as described above. As soon as the user tugs the cursor loose, the system is no longer in the scroll-wheel volume adjust mode. Additionally, a right button click causes the volume control widget to become invisible along with any other pop-up control widgets that may be visible. According to another exemplary embodiment of the present invention, the volume control object 2202 can be used through a pointing behavior.

The communications control object is one of the controls that are available at all times on all views. As such, it is a member of the scrollable list for all views just like the transport control widget. Scrolling to the communication control widget makes a small icon in the communication control corner visible. Since it is a single object, the user can scroll past it with a single click. To access more details of the current state of communication alerts the user should select the communication icon. The communication icon can become visible for at least any of the following three reasons: (1) a communications event causes the communication icon to appear temporarily as an alert, (2) the user points into the corner where communication events are displayed, or (3) the user scrolls to the communication icon.

Channel control, as previously described, is part of the Live TV view. The channel control widget is on the scrollable list of the Live TV view. Scrolling in the Live TV view will make the channel control, transport control and communications control icons visible in turn. The channel control widget contains the metadata browser and associated controls which are also on the scrollable list. An idle timer causes the channel control widget to become invisible. A right-click while in the Live TV view causes all control widgets to become invisible. The metadata browser currently becomes visible in conjunction with channel control. The metadata browser contains links to other controls such as DVR and On-Demand. A full view transition takes place when zooming to these additional areas.

Figure 27:
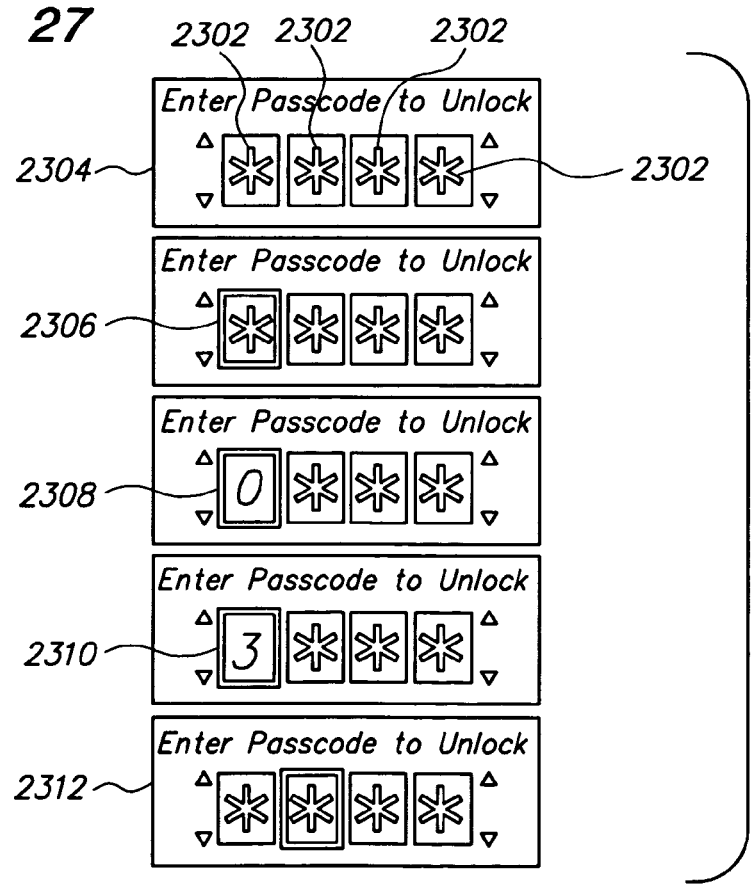
FIG. 27 illustrates a passcode system according to an exemplary embodiment of the present invention.

According to another exemplary embodiment a passcode system can be used to allow access to a variety of items. An exemplary passcode widget is displayed in FIG. 27 which illustrates the sequence to enter a digital value. The displayed passcode widget shows four separate digits to be entered, but more or less could be used. Each digit 2302 can have a value from 0-9. Entry of each digit can be performed by either a point-and-click method or a scrolling method. Each of the four digits is a scrollable widget. The first passcode widget 2304 illustrates the state in which no digits have the focus. In this state all digits are masked. The first scroll-wheel click highlights the first digit as seen in passcode widget 2306. The user can scroll to each digit in turn. A left click will unmask the single digit highlighted as depicted in passcode widget 2308. In this state, rotating the scroll-wheel will change the digit value as seen in passcode widget 2310. A right click will mask the digit. At this point, scrolling will move across the digits and one forward click rotation will highlight the next digit as seen in passcode widget 2312. The sequence is the same for each digit and digits can be changed in any order.

Figure 28:
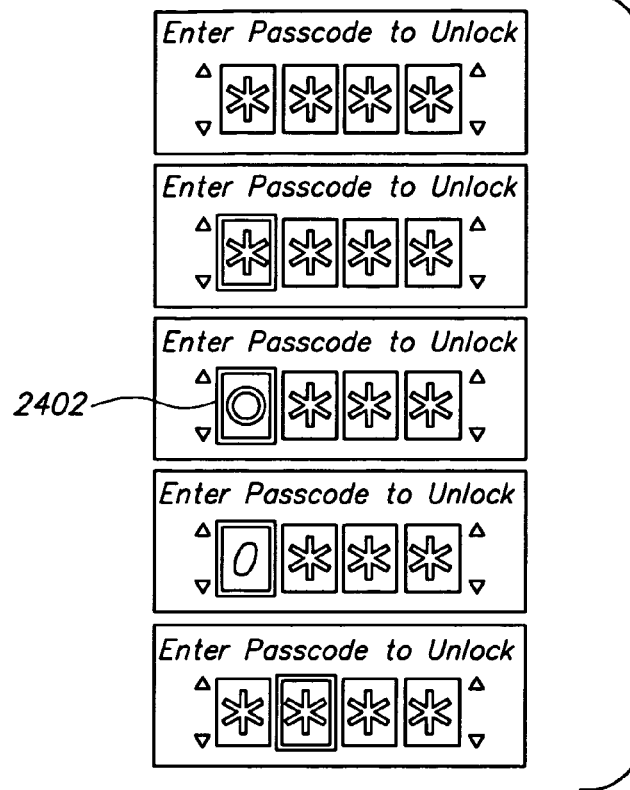
FIG. 28 illustrates an alternate passcode system according to an exemplary embodiment of the present invention.

According to the following exemplary embodiment of the present invention, an alternate method for passcode entry is illustrated in FIG. 28, in which the passcode digits are never displayed in the clear on the screen. The sequence used is similar to the previously described method of passcode entry, except that a circle 2402 indicates that the digit can now be changed without revealing the value. The user enters the value by counting the scroll-wheel clicks. Scrolling up nine or more clicks assures that the current value is zero. The user then enters the desired value by scrolling down and counting the scroll-wheel clicks. A right click exits digit change mode and locks in the last value entered. If the user needs to enter a passcode more frequently, an alternate embodiment that is more efficient could be used such as using the scroll-wheel as a combination dial.

Figure 29:
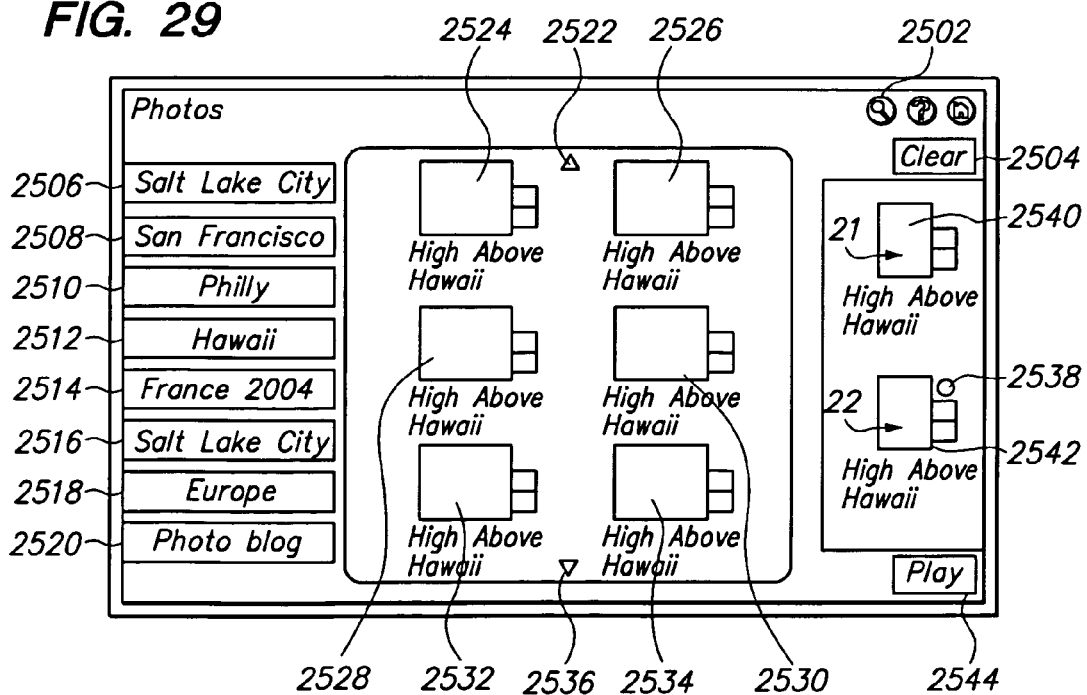
FIG. 29 depicts the scrolling order for the photo application view according to an exemplary embodiment of the present invention.

According to another exemplary embodiment of the present invention, the scroll algorithm previously described can be applied to a photo application. FIG. 29 illustrates the scrolling order for the photo application view. Scrolling starts from wherever the cursor was last positioned. The default starting position is the upper left icon 2502 in the global navigation group. The 'clear' button 2504 is the next button in sequence after the global navigation group. A logical sequence when just starting is to clear the playlist. Scrolling then proceeds to the photo categories along the left side of the display numbered 2506, 2508, 2510, 2512, 2514, 2516, 2518 and 2520. Scrolling forward then moves to the top of the vertical scroll list of photos to the page-up button 2522. A left click on the page-up button 2522 will initiate a page-up. Scrolling then proceeds through the list of photos 2524, 2526, 2528, 2530, 2532, 2532 and 2534. If there are more photos in the currently displayed list, then scrolling past the last photo (in this example photo 2534) will trigger an automatic page-down. Scrolling in the backward direction past item 2524 will trigger an automatic page-up. When the user reaches the last photo (or other displayed image) the next scroll position reached is the page-down button 2536. Following the page-down button 2536, scrolling proceeds to the vertical scrollable playlist 2538 containing photos 2540 and 2542. If there are more photos in the playlist then can fit in this viewing area, page-up and page-down buttons for this area will become visible and will be added to the scrolling list. When the user reaches the last item in the list, the next scroll position is the play button 2544. Also, as per previous layouts, transport control (not shown) followed by communications control (not shown) follow the last object, which in the example displayed in FIG. 29 is play button 2544.

Managing and displaying photos can be a complex problem. A high level list of functions into which scroll-wheel algorithms can be associated therewith is as follows: (1) visual browser (two dimensional), (2) integrated search, (3) hyper links, (4) favorites, (5) image manipulation, (6) image touch-up, (7) slide show, (8) smart slide show, (9) import/export, (10) playlist (time based), (11) printing, (12) sharing and (13) integrated radio.

According to another exemplary embodiment of the present invention, scroll-wheel functions can be associated with the problem of managing and displaying music. A similar layout as described above with respect to photos could be used. Additionally a high level list of functions into which scroll-wheel algorithms can be associated therewith is as follows: (1) visual browser of textual items (three click), (2) integrated search, (3) hyper links, (4) favorites, (5) playlists (construction and management), (6) home networking, (7) equalizer, (8) visualizer, (9) music store, (10) construct music library, (11) import/export and (12) integrated radio.

Figure 30:
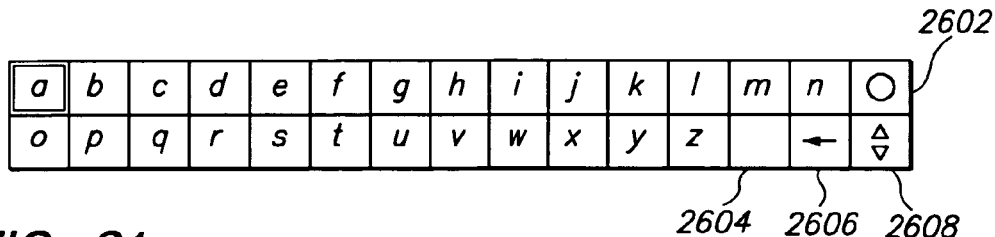
FIG. 30 shows a text entry widget according to an exemplary embodiment of the present invention.

According to another exemplary embodiment, text entry is a selection from an ordered list and in alphabetical order is convenient for scrolling purposes. An exemplary text entry widget is illustrated in FIG. 30. This text entry widget has two rows of letters 'a' through 'z', and four other selectable items. The other selectable items are (1) a circle dot symbol 2602 used to delete all the characters entered and reset the screen, (2) a space key 2604, (3) a backspace key 2606 and (4) a vertical two-headed arrow key 2608 used to expand and contract the text entry widget to reveal numbers and special symbols.

Figure 31:
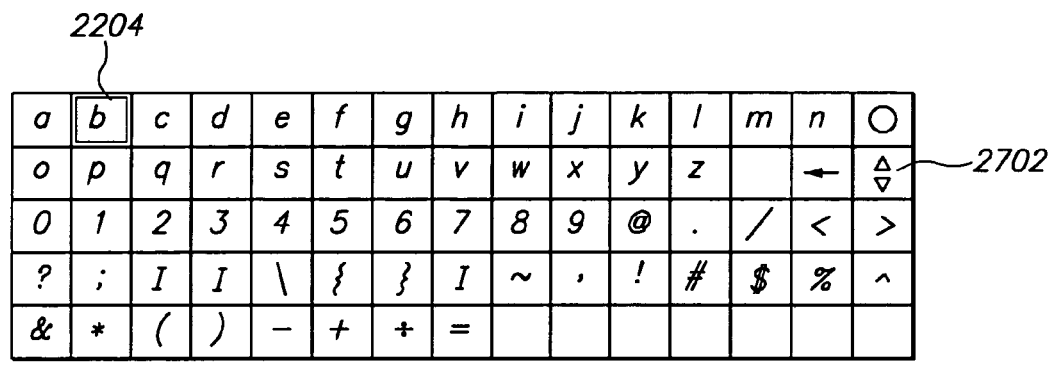
FIG. 31 shows an expanded text entry widget according to an exemplary embodiment of the present invention.

FIG. 31 illustrates the expanded text entry widget that appears on the screen after the user activates the vertical two-headed arrow key 2702. Additionally, the vertical two-headed arrow key 2702 functions as a toggle to revert back to the two-row layout. The layout uses the standard scrolling sequence starting at the top and progressing left-to-right and top-to-bottom. The user can use either pointing or scrolling to reach each desired letter and the user can also switch from pointing to scrolling and back at will. The left button is used to select a letter symbol, shown in this example as the highlighted letter 'b' 2704.

Figure 32:
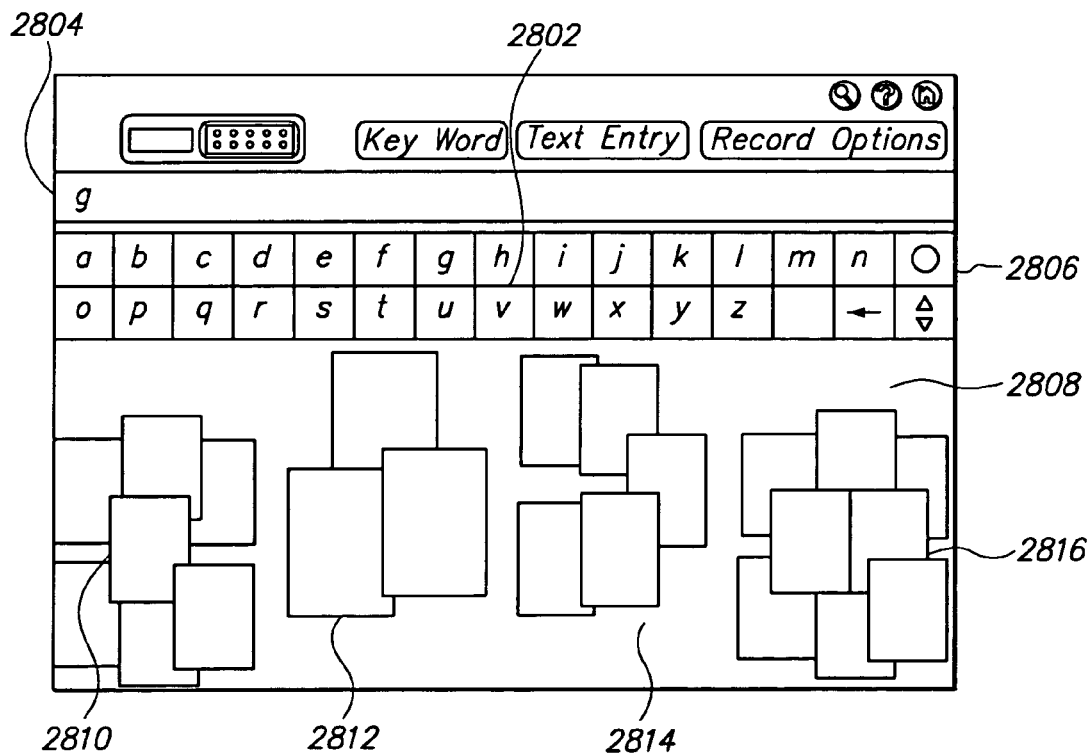
FIG. 32 illustrates using the text entry widget to search according to an exemplary embodiment of the present invention.
Figure 33:
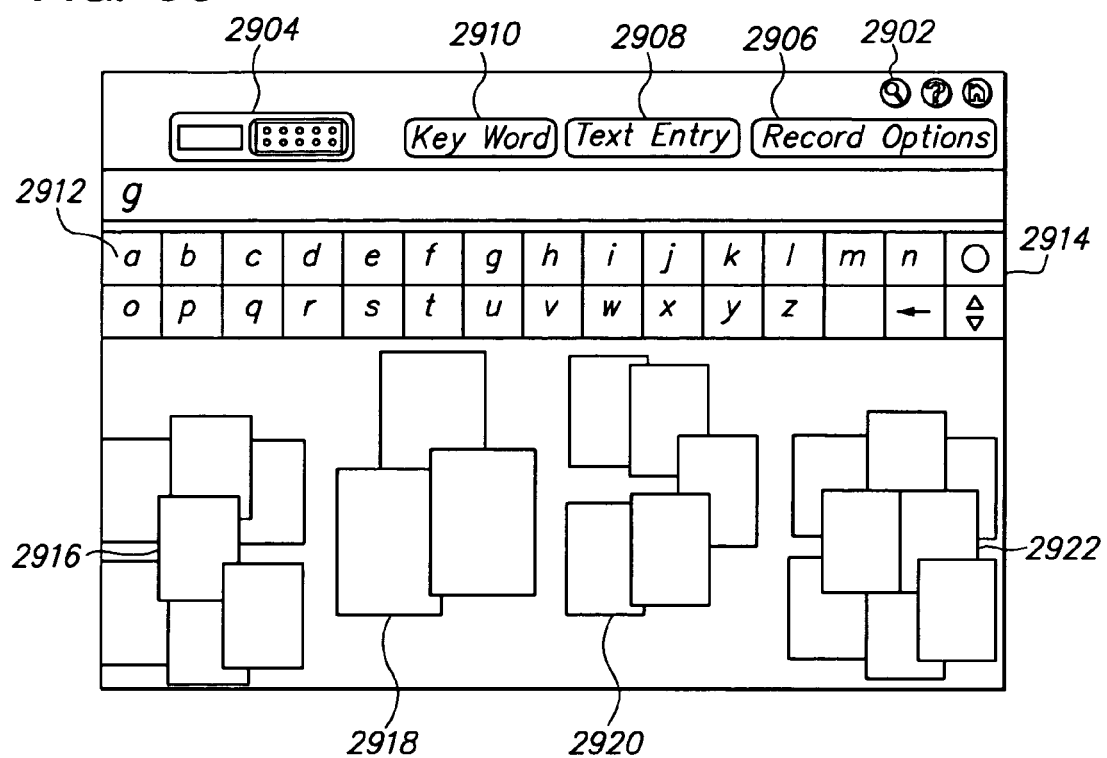
FIG. 33 depicts the scrolling order for a layout with a text entry widget used to create a search according to an exemplary embodiment of the present invention.

Within the context of hand held pointing devices, text entry is often associated with a search. Text entry is one of several methods in which a user may initiate a search, and searching is one of several methods to select an item from a group of items. An exemplary embodiment of the present invention is shown in FIG. 32, wherein an example of using text entry for a search is integrated with a visual browser. As the user enters a letter, 'g' 2802, the letter appears in the text box 2804 and search results 2810, 2812, 2814 and 2816 appear below the text entry widget 2806 in the lower portion of the view 2808. Each group of search results contains multiple items, but could be greater or fewer depending upon what is entered for the search and the number of related items to search from. At any time the user can stop entering text and move to the browser either through pointing or scrolling. Additionally, the browser provides a hovering and zoomable interface. FIG. 33 enumerates the scrolling order for this type of layout. The first item is the left-most global navigation icon 2902 followed by the rest of the global navigation icons and option buttons 2904, 2906, 2908, and 2910. The next selectable option is the upper left-most item on the text entry widget, 'a' 2912, followed by the rest of the items on the text entry widget 2914 going from left-to-right and top-to-bottom. After scrolling through all of the options on the text entry widget 2914, the next item on the scrollable list is the leftmost group 2916 followed by groups 2918, 2920 and 2922. As described above, scrolling takes place at the group level. To select individual items in a group the user selects the group and zooms-in. Additionally, a hovering effect is applied to the group that contains the cursor and has the focus.

Other methods of searching include visual browsing, key word selection, recommendations and find-similar functions. All methods of searching are well integrated into the graphical user interface.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

Numerous variations of the afore-described exemplary embodiments are contemplated. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, used herein, the article "a" is intended to include one or more items.

What is claimed is:

1. A method for jump scrolling through objects comprising the steps of:
   detecting a jump scroll gesture, wherein said jump scroll gesture includes rotating a scroll wheel; and
   skipping a group of objects which are positioned next in a scrolling sequence relative to a current cursor position to select another object in response to said jump scroll gesture, wherein said jump scroll gesture includes rotating said scroll wheel in a first direction by at least one click, then rotating said scroll wheel in a second direction by a single click and then rotating said scroll wheel in said first direction.

2. The method of claim 1, wherein said jump scroll gesture is a jump forward scroll gesture and further wherein said jump forward scroll gesture includes the steps of:
   rotating said scroll wheel in forward direction;
   then rotating said scroll wheel a single click in a backward direction; and
   then rotating said scroll wheel in said forward direction.

3. The method of claim 2, wherein said jump forward scroll gesture is reset by scrolling over two or more objects in a same direction.

4. The method of claim 1, wherein said jump scroll gesture is a jump backward scroll gesture and further wherein said jump backward scroll gesture includes the steps of:
   rotating said scroll wheel in backward direction;
   then rotating said scroll wheel a single click in a forward direction; and
   then rotating said scroll wheel in said backward direction.

5. The method of claim 4, wherein said jump backward scroll gesture is reset by scrolling over two or more objects in a same direction.

6. A non-transitory computer-readable medium containing instructions which, when executed on a computer, perform the steps of:
   displaying a first set of objects on a display;
   detecting a jump scroll gesture, wherein said jump scroll gesture includes rotating a scroll wheel; and
   skipping a group of objects which are positioned next in a scrolling sequence relative to a current cursor position to select another object in response to said jump scroll gesture, which results in a second set of objects being displayed on said display, wherein said jump scroll gesture includes rotating said scroll wheel in a first direction by at least one click, then rotating said scroll wheel in a second direction by a single click and then rotating said scroll wheel in said first direction.

7. The non-transitory computer-readable medium of claim 6, wherein said jump scroll gesture is a jump forward scroll gesture and further wherein said jump forward scroll gesture includes the steps of:

rotating said scroll wheel in forward direction;
then rotating said scroll wheel a single click in a backward direction; and
then rotating said scroll wheel in said forward direction.

8. The non-transitory computer-readable medium of claim 6, wherein said jump scroll gesture is a jump backward scroll gesture and further wherein said jump backward scroll gesture includes the steps of:

rotating said scroll wheel in backward direction;
then rotating said scroll wheel a single click in a forward direction; and
then rotating said scroll wheel in said backward direction.

9. A method for jump scrolling through objects comprising the steps of:

detecting a jump scroll gesture, wherein said jump scroll gesture includes rotating a scroll wheel; and
skipping a group of objects which are positioned next in a scrolling sequence relative to a current cursor position to select another object in response to said jump scroll gesture, wherein said scrolling sequence wraps around for collections of said objects which bridge a plurality of graphical user interface screens.

\* \* \* \* \*